United States Patent
Uzawa

Patent Number: 6,016,228
Date of Patent: Jan. 18, 2000

[54] ZOOM LENS SYSTEM

[75] Inventor: Tsutomu Uzawa, Hidaka, Japan

[73] Assignee: Olympus Optical Co. Ltd., Tokyo, Japan

[21] Appl. No.: 08/825,735

[22] Filed: Apr. 2, 1997

[30] Foreign Application Priority Data

Aug. 23, 1996 [JP] Japan .................................. 8-222197

[51] Int. Cl.⁷ .................................................. G02B 15/14
[52] U.S. Cl. .......................... 359/687; 359/683; 359/684
[58] Field of Search .................................... 359/687, 683, 359/676, 684

[56] References Cited

U.S. PATENT DOCUMENTS

| 5,418,646 | 5/1995 | Shibata et al. | 359/687 |
| 5,600,490 | 2/1997 | Sugawara et al. | 359/687 |
| 5,745,301 | 4/1998 | Betensky et al. | 359/687 |

FOREIGN PATENT DOCUMENTS

| 63-29718 | 2/1988 | Japan . |
| 6-194572 | 7/1994 | Japan . |

Primary Examiner—Georgia Epps
Assistant Examiner—Jordan M. Schwartz
Attorney, Agent, or Firm—Pillsbury Madison & Sutro, LLP

[57] ABSTRACT

The invention provides a zoom lens system which achieves a wide angle of field, has a simplified construction, and is suitable for use on video cameras. The zoom lens system comprises, in order from an object side thereof, a first lens group G1 having positive refracting power, a second lens group G2 having negative refracting power, a third lens group G3 having positive refracting power, and a fourth lens group G4 having positive refracting power. The second lens group G2 moves toward an image side thereof while the third G3 and fourth G4 lens groups move constantly toward the object side for zooming from a wide-angle end thereof to a telephoto end thereof. The first lens group G1 consists only of a positive single lens.

27 Claims, 14 Drawing Sheets

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

(Wide-angle)

(Intermediate)

(Telephoto)

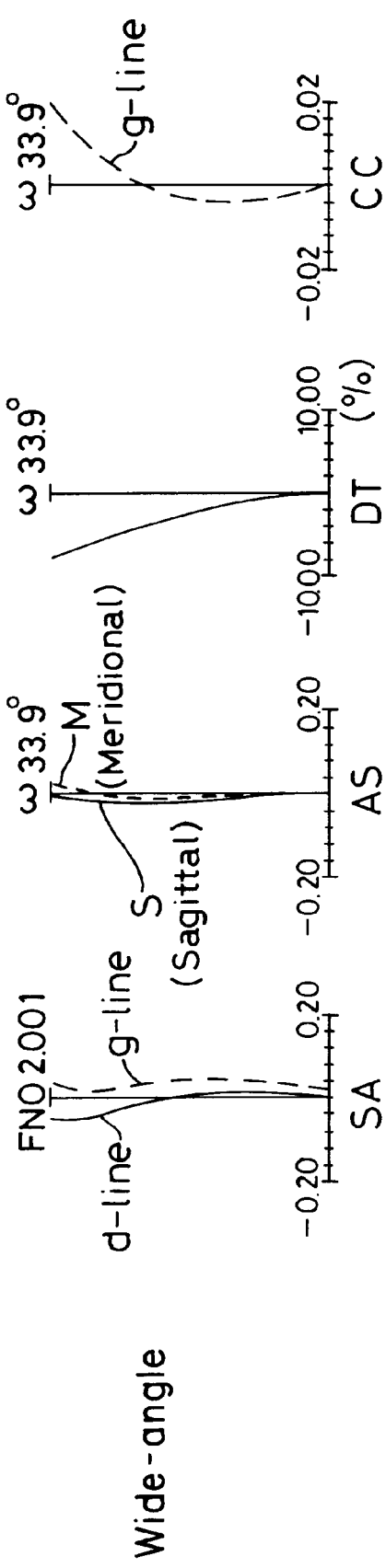
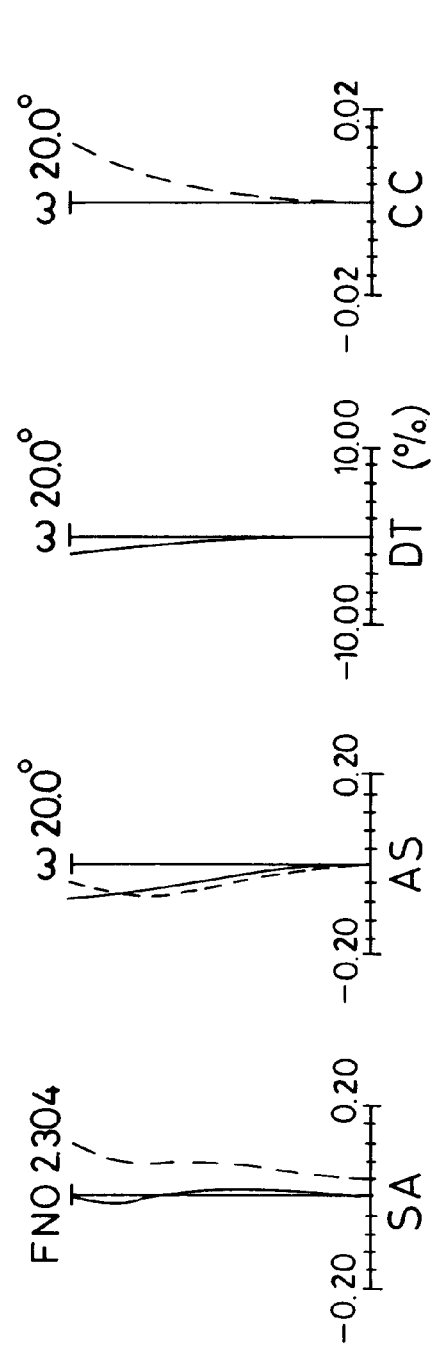

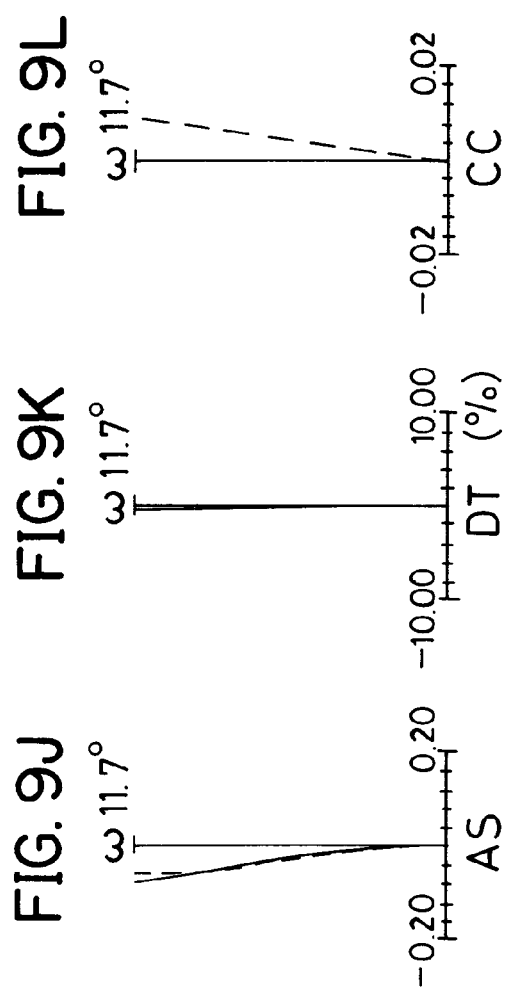

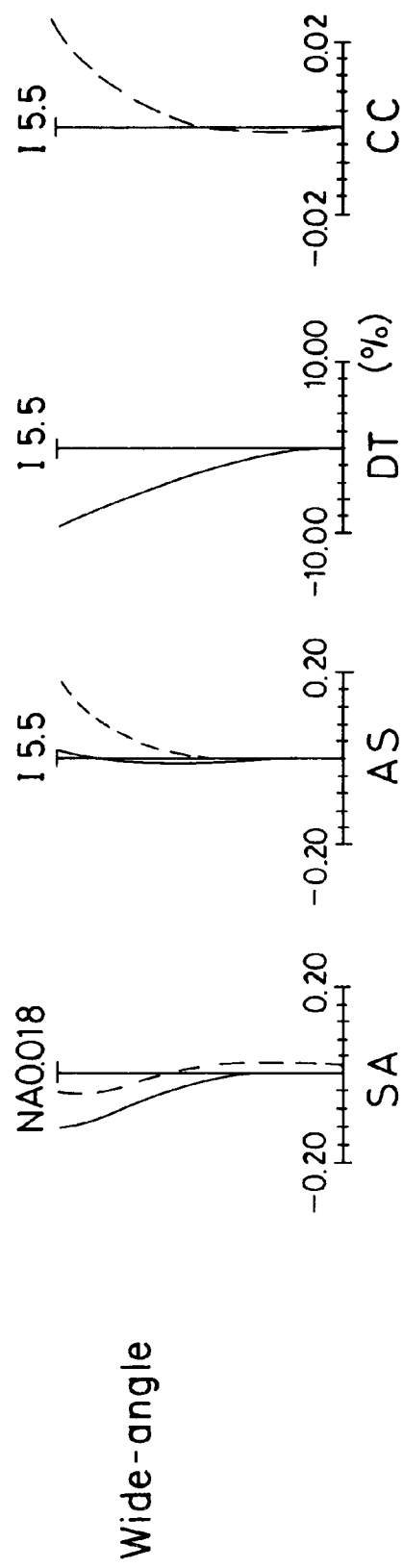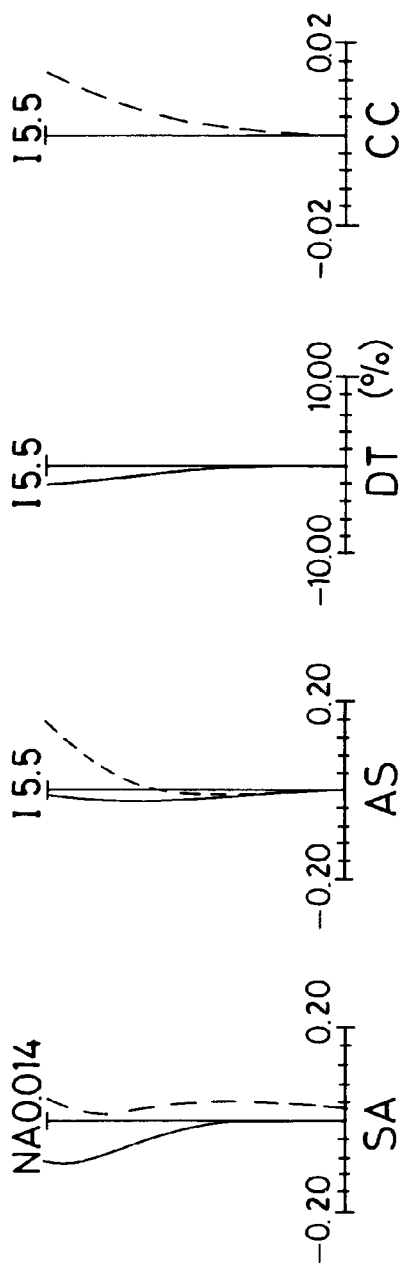
Wide-angle
Intermediate

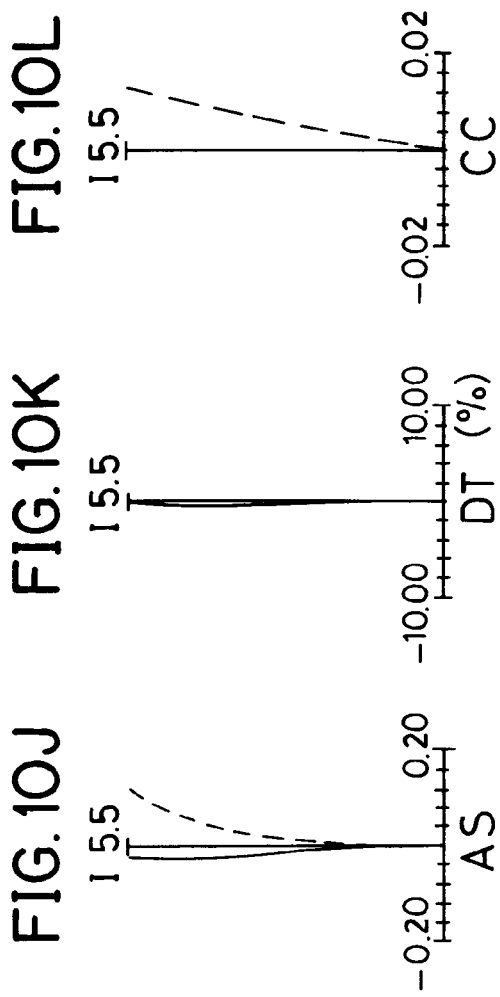
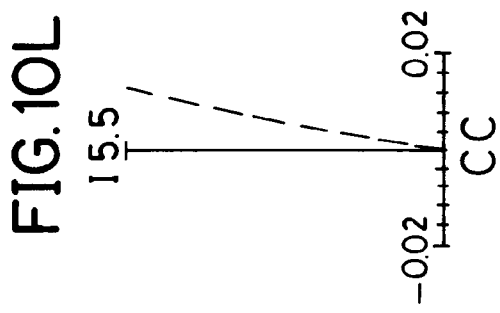
Telephoto

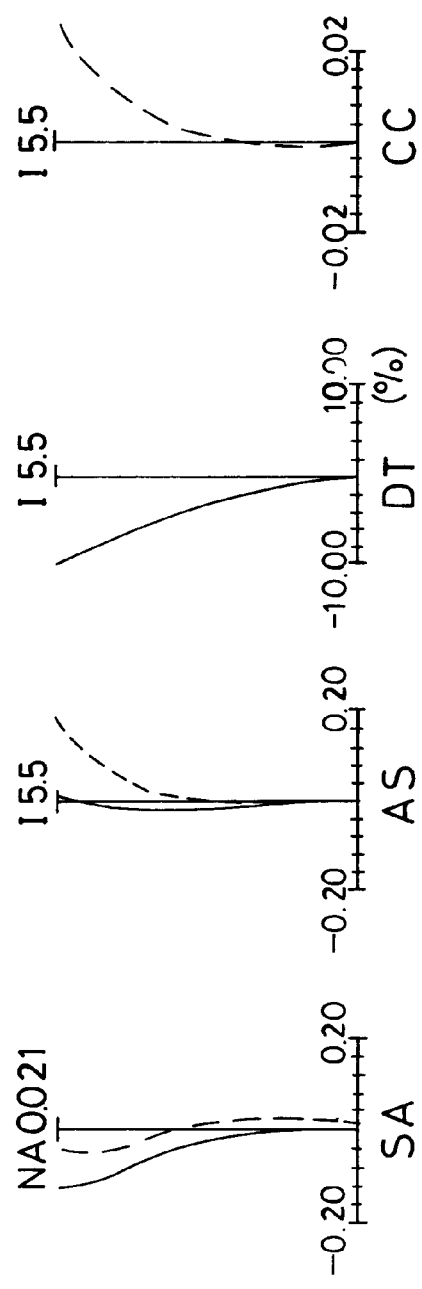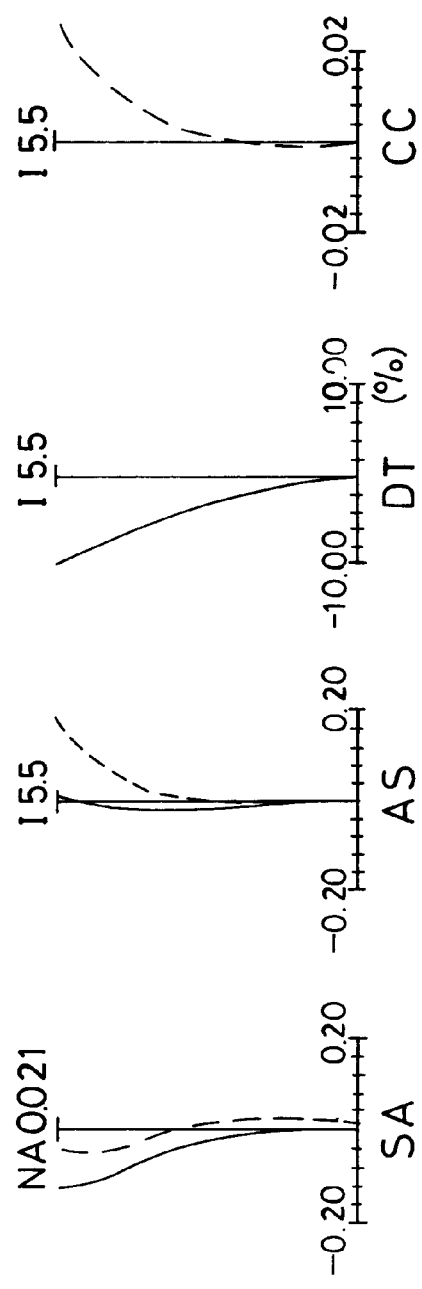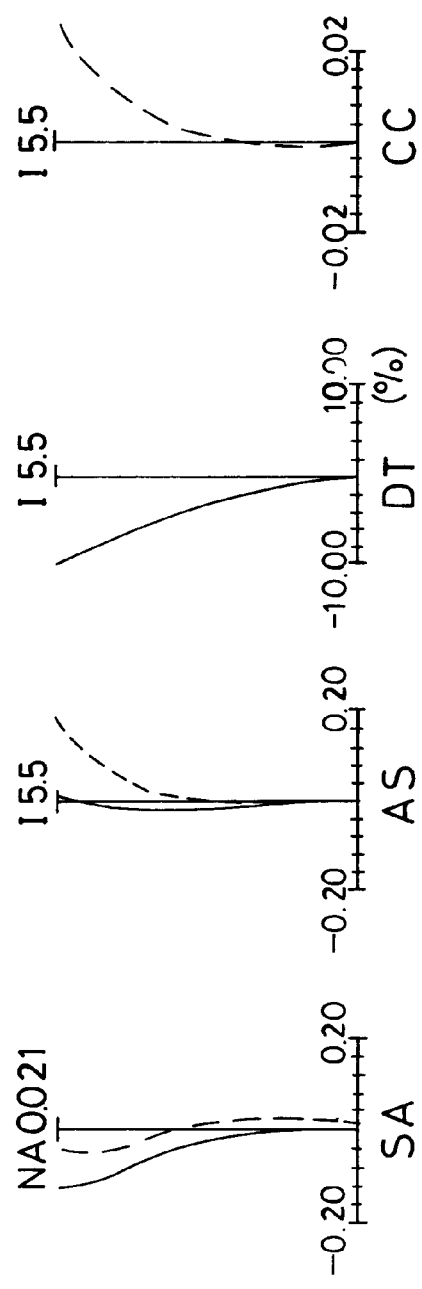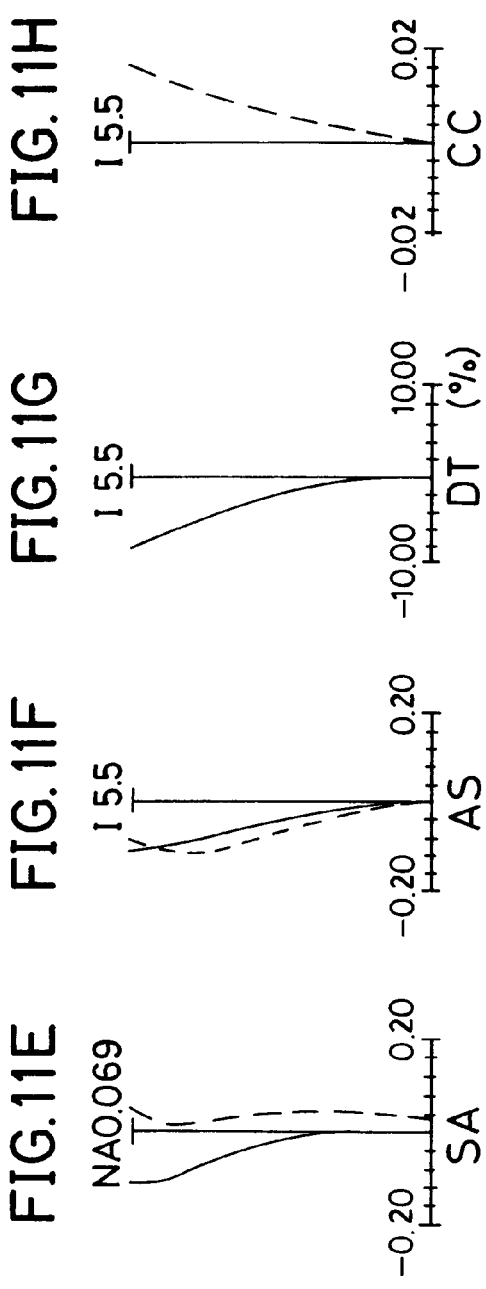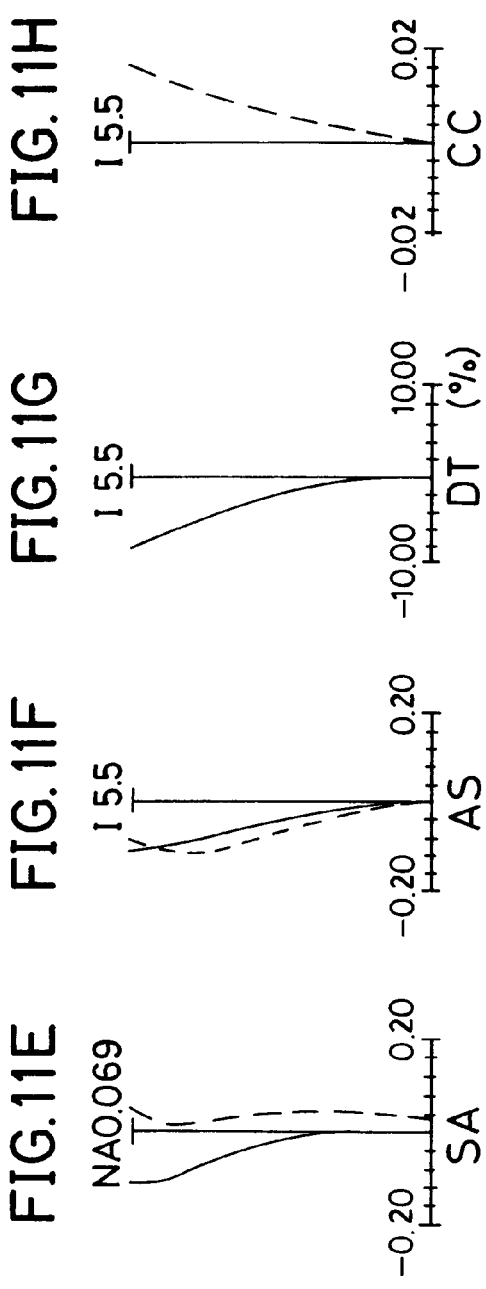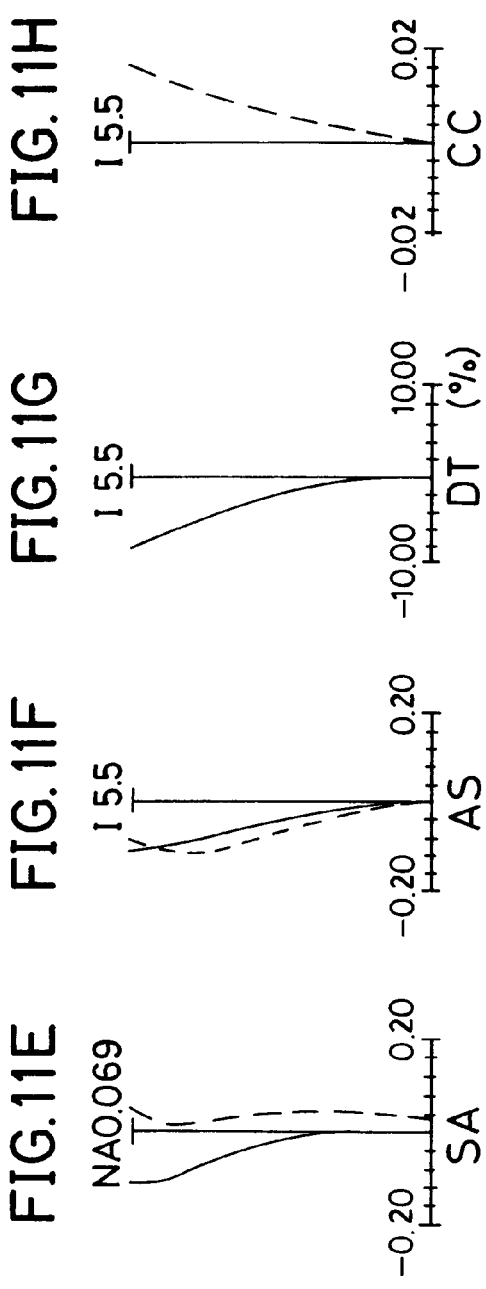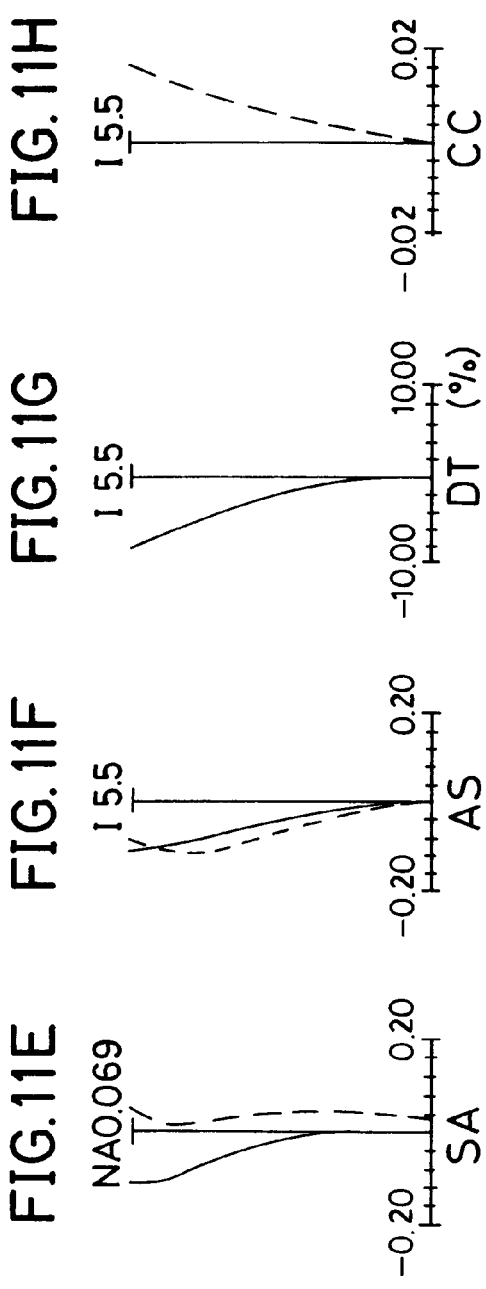
Wide-angle
Intermediate

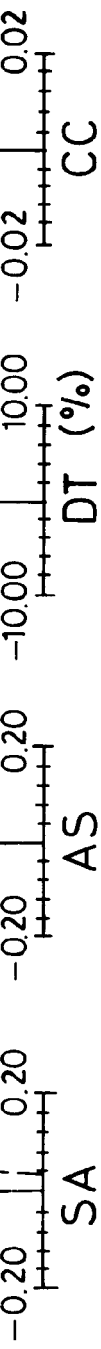

ZOOM LENS SYSTEM

BACKGROUND OF THE INVENTION

1. Field of the Invention

The present invention relates generally to a zoom lens system, and more particularly to a wide-field-angle zoom lens system suitable for use on video cameras.

2. Related Art

In recent years, zoom lens systems of the type which, as typically disclosed in JP-A-63-29718, comprise four lens groups or positive, negative, positive, and positive lens groups as viewed from the object side, and in which zooming is carried out by the second group, and correction of an image position due to zooming, and focusing are performed by the fourth group, have prevailed for use on general-purpose video cameras. Most of these types of zoom lens systems are designed to have a field angle 2ω of about 50° at the wide-angle end. JP-A-6-94997, on the other hand, discloses a four-group zoom lens system having a field angle as large as about 65° at the wide-angle end. This zoom lens system, comprising positive, negative, positive, and positive lens groups from the object side, achieves a wide field angle by conforming to various conditions while the second, third, and fourth lens groups are movable for zooming. JP-A-6-194572, too, discloses a system having such similar structure as set forth in JP-A-6-94997.

However, the system set forth in JP-A-6-94997 is disadvantageous in terms of cost because its lens barrel becomes large and heavy due to the first lens group that does not only have the largest outer diameter but is constructed of three lenses as well.

JP-A-6-194572, on the other hand, appears to fail to achieve a wide field angle, because all examples but the fifth one are directed to systems in which the first lens group is constructed of three lenses, and the focal length thereof at the wide-angle end is 5.7 to 6.2 with respect to an image height Y' of 3.1, or the angle of field is of the order of 57 to 53°. The fifth example is directed to a zoom lens system which has an angle of field of about 50° and so is not improved at all in this regard. This is because although the first lens group is constructed of two lenses yet the focal length thereof at the wide-angle end is 6.7 with respect to an image height Y' of 3.1.

SUMMARY OF THE INVENTION

Situations being like this, an object of the present invention is to provide a zoom lens system which achieves a wide field angle with a simplified construction, and lends itself to use on video cameras.

According to one aspect of the present invention, the aforesaid object is accomplished by the provision of a zoom lens system characterized by comprising, in order from an object side thereof, a first lens group having positive refracting power, a second lens group having negative refracting power, a third lens group having positive refracting power, and a fourth lens group having positive refracting power.

The second lens group moving toward an image side thereof while said third, and fourth lens groups move constantly toward the object side for zooming from a wide-angle end thereof to a telephoto end thereof.

The first lens group consists only of a positive single lens.

According to another aspect of the present invention, there is provided a zoom lens system characterized by comprising, in order from an object side thereof, a first lens group having positive refracting power, a second lens group having negative refracting power, a third lens group having positive refracting power, and a fourth lens group having positive refracting power.

The second lens group moves toward an image side thereof while the third and fourth lens groups move constantly toward the object side for zooming from a wide-angle end to a telephoto end thereof.

The first lens group consists only of a positive single lens.

The second lens group includes at least one positive lens, and either one of the third or fourth lens groups includes at least one negative lens.

According to yet another aspect of the present invention, there is provided a zoom lens system characterized by comprising, in order from an object side thereof, a first lens group having positive refracting power, a second lens group having negative refracting power, a third lens group having positive refracting power, and a fourth lens group having positive refracting power.

The second lens group moves toward an image side thereof while the third and fourth lens groups move constantly toward the object side for zooming from a wide-angle end to a telephoto end thereof.

The first lens group consists only of a positive single lens.

The second lens group includes at least one positive lens.

The third lens group includes at least one negative lens, and the fourth lens group consists only of a positive single lens.

According to still yet another aspect of the present invention, there is provided a zoom lens system characterized by comprising, in order from an object side thereof, a first lens group having positive refracting power, a second lens group having negative refracting power, a third lens group having positive refracting power, and a fourth lens group having positive refracting power.

The second lens group moves toward an image side thereof while the third and fourth lens groups move constantly toward the object side for zooming from a wide-angle end to a telephoto end thereof.

The first lens group consists only of a positive single lens, and further includes a stop fixedly located between the second and third lens groups.

According to a further aspect of the present invention, there is provided a zoom lens system characterized by comprising, in order from an object side thereof, a first lens group having positive refracting power, a second lens group having negative refracting power, a stop, a third lens group having positive refracting power, and a fourth lens group having positive refracting power.

The second lens group moves toward an image side thereof and the third and fourth lens groups move constantly toward the object side while the first lens group and stop remain fixed, for zooming from a wide-angle end to a telephoto end thereof.

The first lens group consists only of a positive single lens.

The second lens group includes at least one positive lens.

The third lens group includes at least one negative lens, and the fourth lens group consists only of a positive single lens.

Furthermore, any one of the aforesaid first to fifth zoom lens systems is characterized in that at least the second lens group is movable for focusing.

A detailed account will now be given of why the aforesaid arrangements are used and how they operate.

JP-A-6-194572, as already mentioned, shows that for zooming, the second and third lens groups move in opposite directions. However, a main portion of the zooming action is born by the second lens group while an auxiliary portion of the zooming action is born by the third lens group. The fourth lens group corrects for an image position in association with zooming, and has little, if any, zooming action. The fact that the second lens group has the zooming action means that zooming takes place by a change in the spacing between the first and second lens groups. For efficient zooming, it is thus required that the second lens group as well as the first lens group have strong refracting power. When the first lens group has strong refracting power, however, it is required that a negative lens be incorporated in the first lens group that has positive refracting power to correct for various aberrations, including chromatic aberration. In addition, the height of off-axis rays passing through the first lens group on the wide-angle side increases. This is unfavorable for making the angle of field wide.

According to each zoom lens system of the present invention, on the other hand, the third plus fourth lens groups move flatly or constantly from the image to object side along the wide-angle to telephoto end. That is, a main portion of the zooming action is born by the third and fourth lens groups. For this reason, the zooming action that is to be born by the second lens group is so reduced that the refracting power of the first lens group can be reduced. It is thus possible to construct the first lens group of one positive single lens and, at the same time, make the angle of field wide. When the first lens group has diminished refracting power, the occurrence of aberrations can be inhibited even with one positive lens, so that variations in chromatic aberration due to zooming can be corrected with no incorporation of a negative lens. In addition, the height of off-axis rays passing through the first lens group can be lowered, and this is favorable for making the angle of field wide.

It is desired that the second to fourth lens groups be constructed as follows.

For making correction for various aberrations inclusive of chromatic aberration, it is preferable that each lens group is made up of a lens or lenses that has or have refracting power opposite in sign to the overall refracting power of each lens group.

It is preferable that the second lens group that has the zooming action is made up of a positive lens or lenses.

It is desired that either one of the third and fourth lens groups having the zooming action and image-forming action includes a negative lens. If the third lens group includes a negative lens, however, it is then possible to construct the fourth lens group of only one, or at least one, positive lens.

To make a reasonable compromise between making the angle of field wide and simplifying the constructions of both lens and barrel arrangements, where a stop is located is of importance. When the angle of field is made wide, the location of the stop at a substantial center of the optical system is favorable for making the first and fourth lens groups compact. For this reason, the stop is located between the second and third lens groups. If, furthermore in this case, the stop is fixedly located on the optical axis, it is then possible to simplify the lens barrel arrangement.

In view of the barrel arrangement, it is further preferable to fix the first lens group during zooming.

For each zoom lens system according to the present invention, it is preferable to satisfy the following condition:

$$-2.5 < z_3/z_2 < -0.45 \text{ where } z_2 > 0 \text{ and } z_3 < 0 \tag{1}$$

where $z_i$ (i=2 or 3) is the amount of movement of an i-th lens group from the wide-angle to telephoto end with the proviso that a plus sign means the movement of the lens group from the object to image side.

Condition (1) gives a definition of the ratio of the amount of movement between the second and third lens groups. By making the amount of movement of the third lens group sufficiently large, the third and fourth lens groups are allowed to bear a main portion of the zooming action. With the upper limit of −0.45 in condition (1) exceeded, there are an increase in the proportion of the zooming action to be born by the second lens group, an increase in the height of off-axis rays passing through the first lens group on the wide-angle side, and an increase in the size of the first lens group. When the lower limit of −0.25 is not reached, the height of off-axis rays passing through the third and fourth lens groups on the wide-angle side increases, resulting in an increase in the diameter of the third and fourth lens groups.

More preferably, condition (1) is reduced to $$-2 < z_3/z_2 < -0.54 \text{ where } z_2 > 0 \text{ and } z_3 < 0 \tag{1-2}$$

Most preferably, condition (1) is reduced to $$-1.5 < z_3/z_2 < -0.6 \text{ where } z_2 > 0 \text{ and } z_3 < 0 \tag{1-3}$$

For each zoom lens system of the present invention, it is desired to satisfy the following condition:

$$0.05 < f_4/f_1 < 0.41 \tag{2}$$

where fi for i=1 or 4 is the focal length of the i-th lens group.

To make each zoom lens system of the present invention wide in terms of the angle of field also means that the focal length of the overall zoom lens system is reduced relative to the size of an image pickup surface. Reducing the focal length of the overall zoom lens system causes the back focus thereof to be reduced, rendering it difficult to make sure of a space where members such as an optical filter are to be located. In the present invention, therefore, a sufficient back focus is ensured by diminishing the refracting power of the first lens group relative to that of the fourth lens group.

Condition (2) gives a definition of the ratio of refracting power between the first and fourth lens groups. With the upper limit of 0.41 in this condition (2) exceeded, the height of off-axis rays passing through the first lens group increases, not only resulting in an increase in the diameter of the first lens group but also rendering it difficult to make sure of a sufficient back focus. When the lower limit of 0.05 in condition (2) is not reached, not only does the efficiency of zooming at the second lens group become worse, but the overall length of the lens system increases as well.

More preferably, condition (2) is reduced to:

$$0.1 < f_4/f_1 < 0.39 \tag{2-2}$$

Most preferably, condition (2) is reduced to:

$$0.2 < f_4/f_1 < 0.38 \tag{2-3}$$

For each zoom lens system of the present invention, it is desired to satisfy the following condition:

$$0.9 < (\beta_{34T}/\beta_{34W})/(\beta_{2T}/\beta_{2W}) < 4 \tag{3}$$

where $\beta_{2W}$ is the magnification of the second lens group at the wide-angle end, $\beta_{2T}$ is the magnification of the second lens group at the telephoto end, $\beta_{34W}$ is the composite magnification of the third and fourth lens groups at the wide-angle end, and $\beta_{34T}$ is the composite magnification of the third and fourth lens groups at the telephoto end.

Condition (3) gives a definition of how the amount of zooming is born by the second lens group, and the third and fourth lens groups. When the lower limit of 0.9 in condition (3) is not reached, there are an increase in the proportion of the zooming action born by the second lens group, an increase in the height of off-axis rays passing through the first lens group on the wide-angle side, and an increase in the size of the first lens group. With the upper limit of 4 exceeded, there are an increase in the height of off-axis rays passing through the third and fourth lens groups on the wide-angle side, and an increase in the size of the third and fourth lens groups.

More preferably, condition (3) is reduced to:

$$0.98 < (\beta_{34T}/\beta_{34W})/(\beta_{2T}/\beta_{2W}) < 3 \quad (3\text{-}2)$$

Most preferably, condition (3) is reduced to:

$$1.1 < (\beta_{34T}/\beta_{34W})/(\beta_{2T}/\beta_{2W}) < 2.5 \quad (3\text{-}3)$$

For each zoom lens system of the present invention, it is desired to satisfy the following condition:

$$0 < f_W/f_1 < 0.2 \quad (4)$$

where $f_W$ is the focal length of the overall zoom lens system at the wide-angle end, and $f_i$ for i=1 is the focal length of an i-th lens group.

Condition (4) needs to be satisfied to make the lens system compact and make sure of its performance. Condition (4) gives a definition of the focal length of the first lens group. Exceeding the upper limit of 0.2 results in an increase in the size of the first lens group, and is unfavorable for making sure of a back focus. When the lower limit of 0 is not reached, $f_1$ has a negative value with a lowering of zooming efficiency and an increase in the overall length of the system. This is also unfavorable for making correction for negative distortion on the wide-angle side.

More preferably, condition (4) is reduced to $$0 < f_W/f_1 < 0.13 \quad (4\text{-}2)$$

Most preferably, condition (4) is reduced to $$0.04 < f_W/f_1 < 0.13 \quad (4\text{-}3)$$

Especially when a compact image pickup device is used in combination with a wide-angle zoom lens system such as one described herein, ordinary image-taking is feasible without recourse to focusing, because the depth of field is large. For picking up images at a shorter distance, however, focusing is needed. In each zoom lens system of the present invention, therefore, at least the second lens group is designed to be movable for the purpose of focusing. In some cases, the second and fourth lens groups may be movable for the purpose of focusing.

In each zoom lens system of the present invention, focusing may be achievable by the fourth lens group. However, the second lens group, too, is suitable for focusing, because the absolute value of the image-formation magnification of the second lens group is relatively small. Furthermore, the second lens group is located on the image side at the telephoto end with respect to the wide-angle end, so that a space sufficient to effect focusing by the second lens group is ensured on the telephoto side. By focusing with the second lens group in combination with the fourth lens group, it is thus possible to pick up images at shorter distances on the telephoto side in particular.

In each zoom lens system of the present invention, it is preferable that focusing is effected by the fourth or second lens group, as already noted. However, focusing may also be effected by the use of other lens groups, or the movement of all the lenses or an image pickup device.

In each zoom lens system of the present invention, plastic lenses may be used for any one of the lens groups. Advantageously, plastic lenses are used especially for the first lens group which undergoes limited changes in the focal position by temperature and humidity changes because of its weak refracting power. The plastic lenses used may be formed of less absorptive materials or materials having a large Abbe's number.

The lens groups may be positioned on the image side of the fourth lens group for the purpose of controlling the position of the exit pupil, making correction for aberrations, achieving compactness, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 9A–9L are aberration diagrams of Example 1 upon focusing at infinity.

FIGS. 10A–10L are aberration diagrams of Example 1 upon focusing at an intermediate short distance by the movement of the fourth lens group.

FIGS. 11A–11L are aberration diagrams of Example 1 upon focusing at an intermediate short distance by the movement of the fourth plus second lens groups.

DESCRIPTION OF THE PREFERRED EMBODIMENTS

Examples 1 to 9 of the zoom lens system according to the present invention will now be explained specifically with reference to FIGS. 1A to 11L.

FIGS. 1A to 8C are sectional schematics of Examples 1–7, and 9 including the optical axes thereof. A lens arrangement of Example 8 is not shown because it is identical with that of Example 7. For the purpose of comparison, the positions of the respective lens groups at the wide-angle end, in an intermediate state, and at the telephoto end are illustrated together with an axial marginal ray and an off-axis principal ray. In the sectional schematics at the wide-angle end, arrows indicate the direction of movement of the respective lens groups for zooming from the wide-angle to telephoto end. Arrows with a capital F, given along the optical axis, show the respective lens groups upon being moved for focusing, and the direction of movement of the respective lens group. A capital S with a ground mark- indicates that the stop is fixed. A plane-parallel plate FI located on the image side of the fourth lens group G4 may be an optical filter, etc.

Figure 1A:
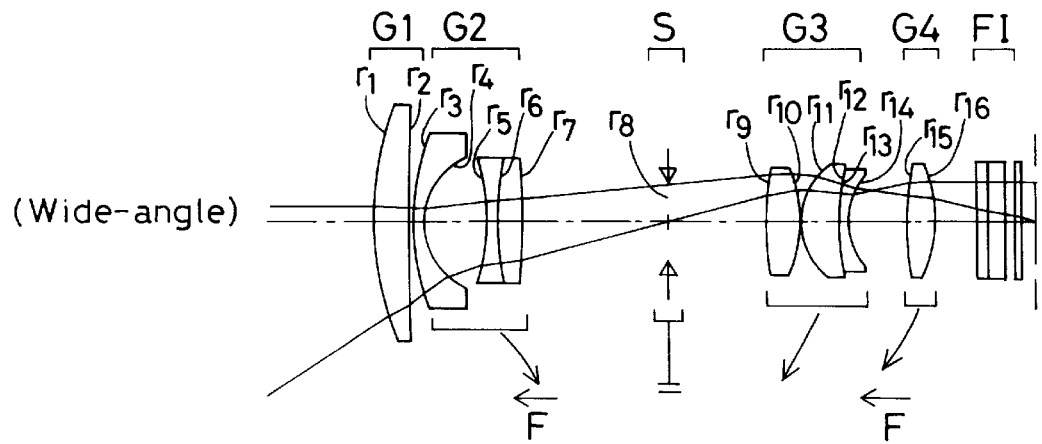
FIGS. 1A–1C are sectional schematics of the zoom lens system according to Example 1 of the invention.
Figure 1B:
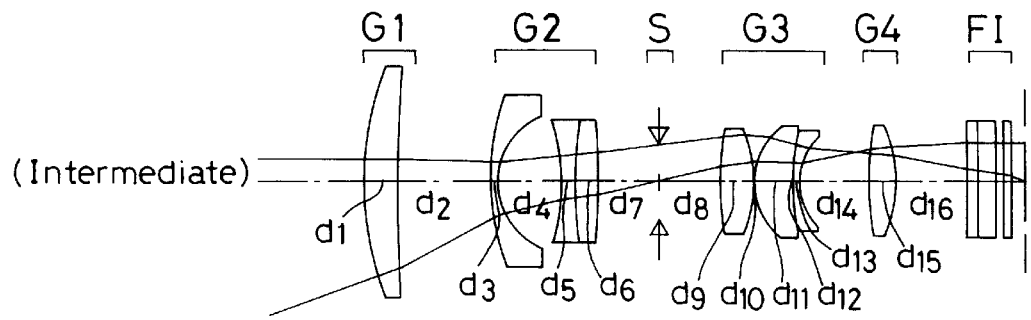
Figure 1C:
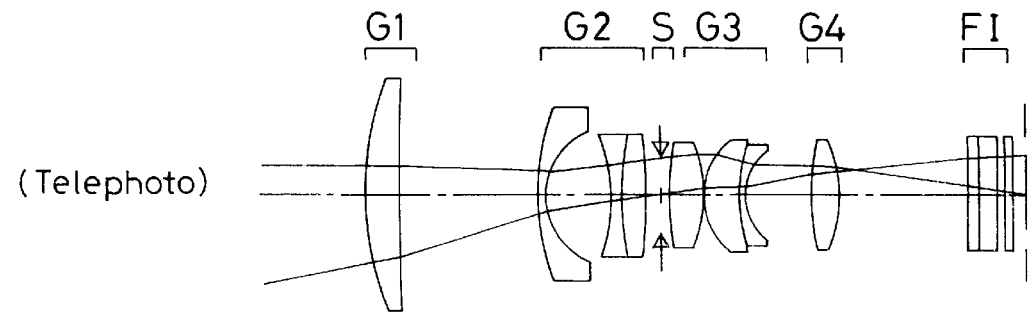

Numerical data about each example will be enumerated later. In Example 1, a first lens group G1 is made up of one positive meniscus lens that is convex on an object side of the zoom lens system; a second lens group G2 is made up of two sub-groups, one consisting of a negative meniscus lens that is convex on the object side, and the other consisting of a doublet formed of a double-concave lens and a double-convex lens, three lenses in all; a third lens group G3 is made up of a double-convex lens, a positive meniscus lens that is convex on the object side and a negative meniscus lens that is convex on the object side, three lenses in all; a fourth lens group G4 is made up of one double-convex lens; and a stop S is located between the second and third lens groups G2 and G3, as shown in FIGS. 1A–1C. Two aspheric surfaces are used, one for the surface of the second lens group G2 located nearest to an image side of the zoom lens system, and another for the surface of the third lens group G3 located nearest to the object side.

In Example 1, zooming from the wide-angle to telephoto end of the system is carried out by moving the second lens group G2 toward the image side and the third and fourth lens groups G3 and G4 toward the object side, as shown. At any field angle position, focusing is effected by moving the fourth lens group G4 toward the object side as long as the object distance is an intermediate short distance (100 mm at the wide-angle end, 200 mm in an intermediate state, and 400 mm at the telephoto end), and moving the fourth plus second lens groups G4 and G2 toward the object side as long as the object distance is a distance shorter than mentioned above (80 mm at the wide-angle end, 10 mm in an intermediate state, and 10 mm at the telephoto end).

Figure 2A:
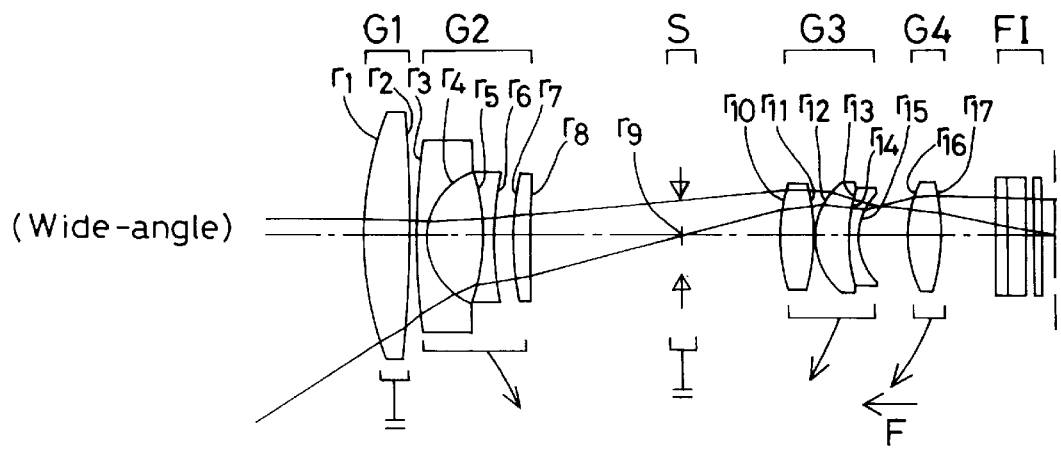
FIGS. 2A–2C are sectional schematics of the zoom lens system according to Example 2 of the invention.
Figure 2B:
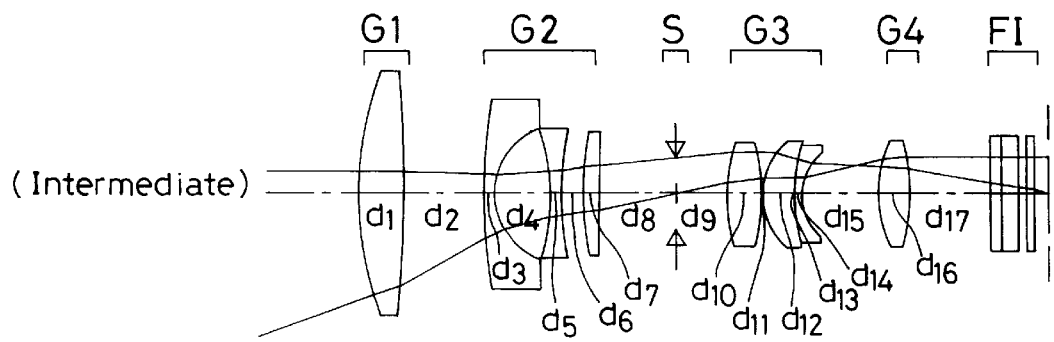
Figure 2C:
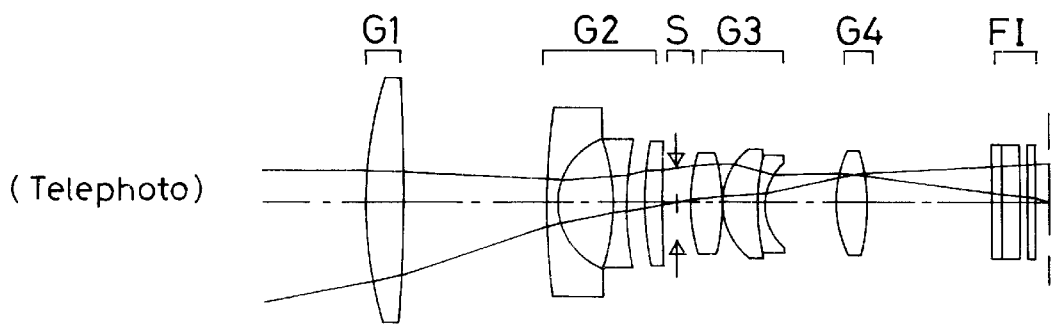
Figure 3A:
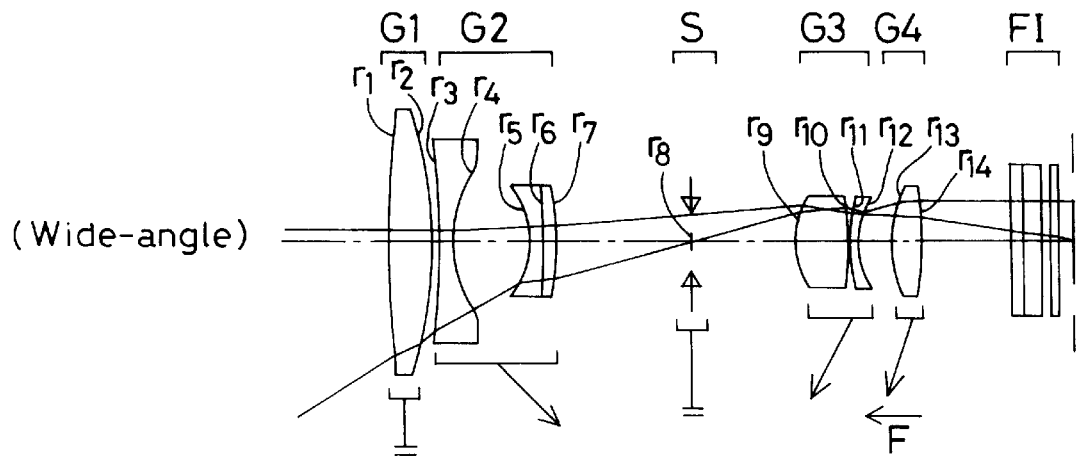
FIGS. 3A–3C are sectional schematics of the zoom lens system according to Example 3 of the invention.
Figure 3B:
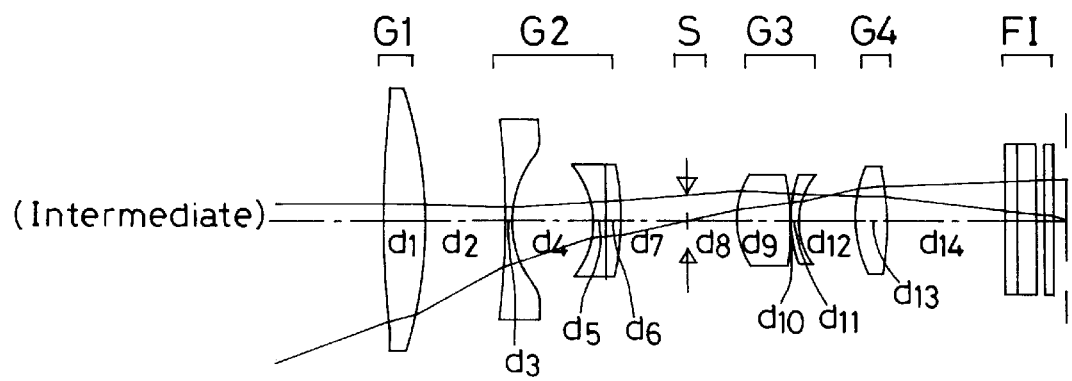
Figure 3C:
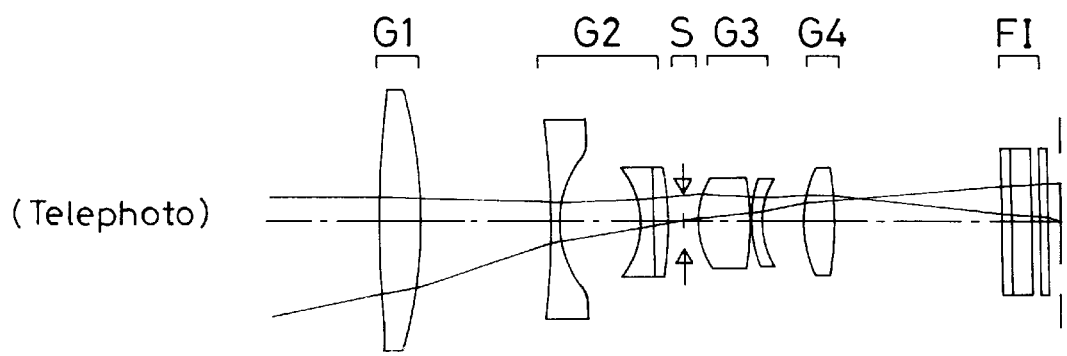

In Example 2, a first lens group G1 is made up of one double-convex lens; a second lens group G2 is made up of a negative meniscus lens convex on an object side of the zoom lens system, a double-concave lens and a positive meniscus lens convex on the object side, three lenses in all; a third lens group G3 is made up of a double-convex lens, a positive meniscus lens convex on the object side and a negative meniscus lens convex on the object side, three lenses in all; a fourth lens group G4 is made up of one double-convex lens; and a stop S is located between the second and third lens groups G2 and G3, as shown in FIGS. 2A–2C. Four aspheric surfaces are used, one for an object-side surface of the first lens group G1, another for an image-side surface of the middle double-concave lens in the second lens group G2, yet another for the surface of the third lens group G3 located nearest to the object side, and still yet another for an object-side surface of the fourth lens group G4.

In Example 2, zooming from the wide-angle to telephoto end of the system is effected by moving the second lens group G2 toward an image side of the system and the third and fourth lens groups G3 and G4 towards the object side, as shown. At any field angle position, focusing is effected by moving the fourth lens group G4 toward the object side.

In Example 3, a first lens group G1 is made up of one double-convex lens; a second lens group G2 is made up of two sub-groups, one consisting of a double-concave lens, and the other consisting of a doublet formed of a negative meniscus lens that is convex on an image side of the zoom lens system and a positive meniscus lens, three lenses in all; a third lens group G3 is made up of a double-convex lens and a negative meniscus lens that is convex on an object side of the system, two lenses in all; a fourth lens group G4 is made up of one double-convex lens; and a stop S is located between the second and third lens groups G2 and G3. Four aspheric surfaces are used, one for an object-side surface of the first lens group G1, another for an image-side surface of the double-concave lens in the second lens group G2, yet another for the surface of the third lens group G3 located nearest to the object side, and still yet another for an object-side surface of the fourth lens group G4.

In Example 3, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

Figure 4A:
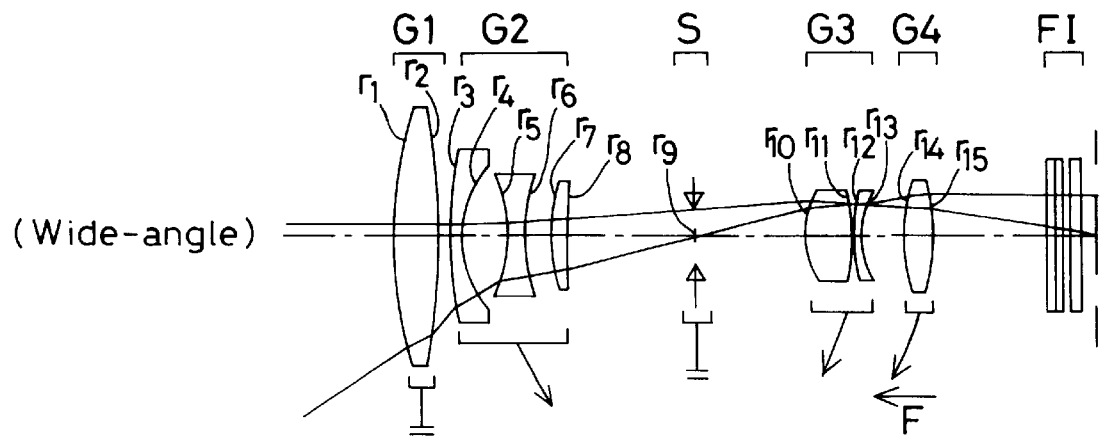
FIGS. 4A–4C sectional schematics of the zoom lens system according to Example 4 of the invention.
Figure 4B:
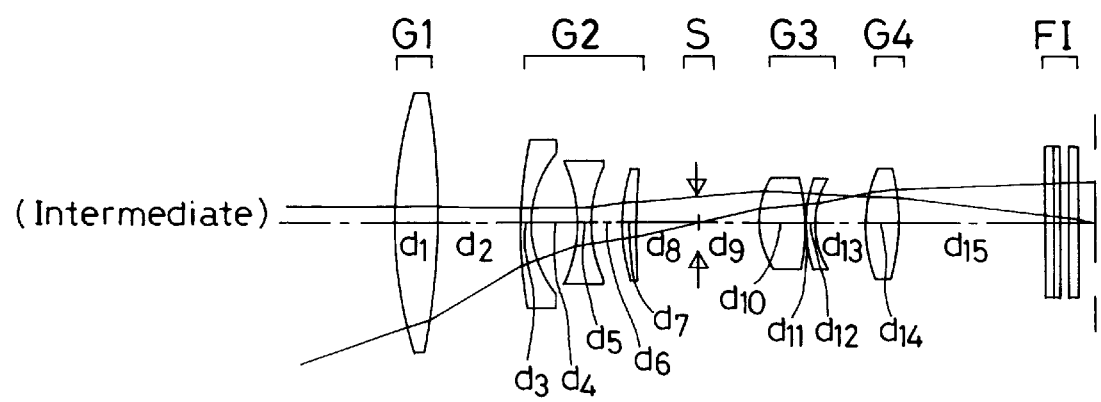
Figure 4C:
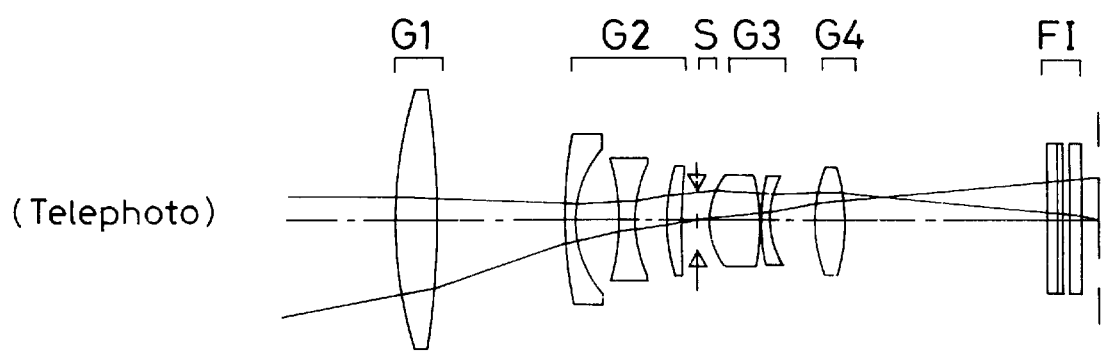

In Example 4, a first lens group G1 is made up of one double-convex lens; a second lens group G2 is made up of a negative meniscus lens that is convex on an object side of the zoom lens system, a double-concave lens and a positive meniscus lens that is convex on the object side, three lenses in all; a third lens group G3 is made up of a double-convex lens and a negative meniscus lens that is convex on the object side, two lenses in all; a fourth lens group G4 is made up of one double-convex lens; and a stop S is located between the second and third lens groups G2 and G3, as shown in FIGS. 4A–4C. Three aspheric surfaces are used, one for an object-side surface of the first lens group G1, another for the surface of the third lens group G3 located nearest to the object side, and yet another for an object-side surface of the fourth lens group G4.

In Example 4, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

Figure 5A:
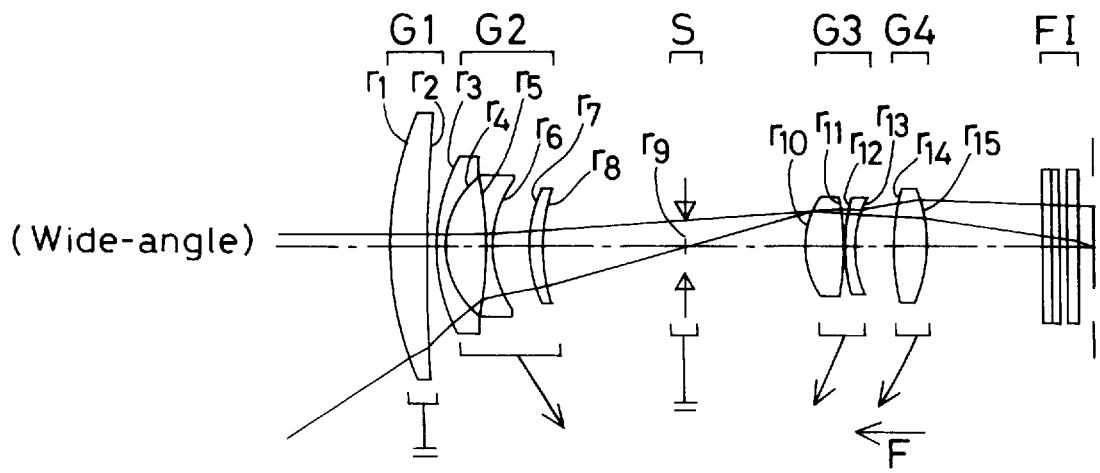
FIGS. 5A–5B are sectional schematics of the zoom lens system according to Example 5 of the invention.
Figure 5B:
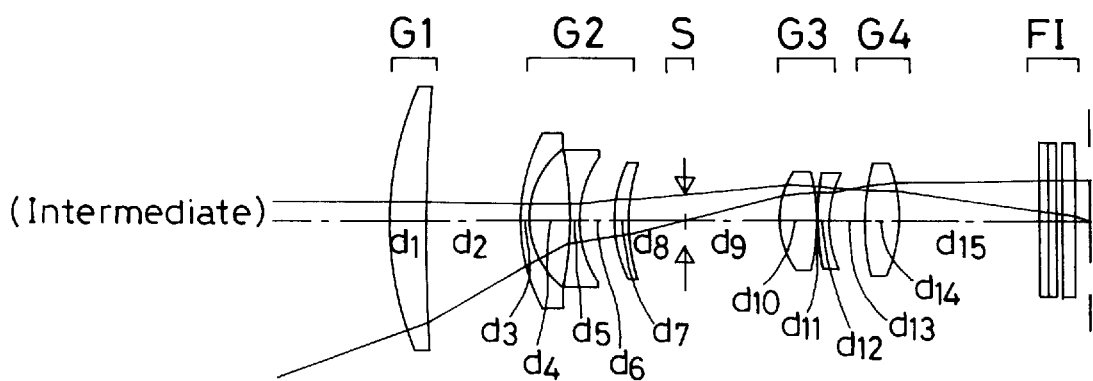
Figure 5C:
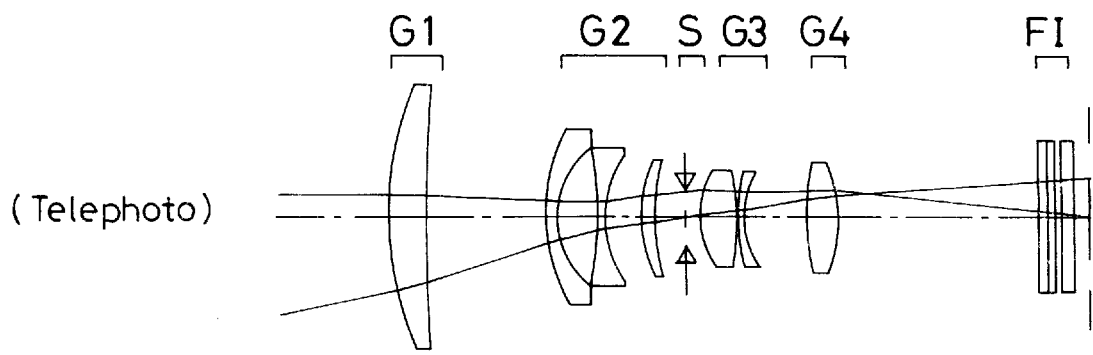

In Example 5, a first lens group G1 is made up of one positive meniscus lens that is convex on an object side of the zoom lens system; a second lens group G2 is made up of a negative meniscus lens that is convex on the object side, a double-concave lens and a positive meniscus lens that is convex on the object side, three lenses in all; a third lens group G3 is made up of a double-convex lens and a negative meniscus lens that is convex on the object side, two lenses in all; a fourth lens group G4 is made up of one double-convex lens; and a stop S is located between the second and third lens groups G2 and G3, as shown in FIGS. 5A–5C. Two aspheric surfaces are used, one for the surface of the third lens group G3 located nearest to the object side, and another for an object-side surface of the fourth lens group G4.

In Example 5, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

Figure 6A:
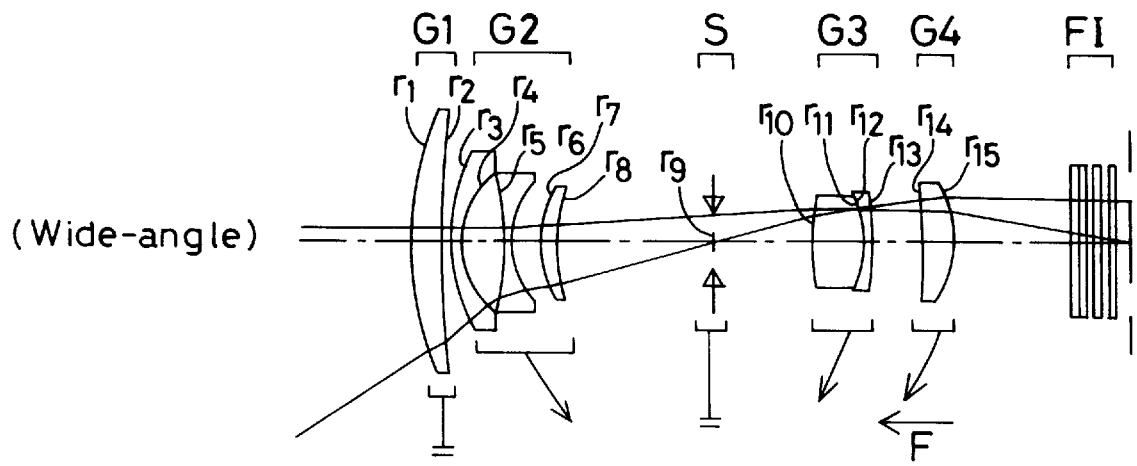
FIGS. 6A–6C are sectional schematics of the zoom lens according to Example 6 of the invention.
Figure 6B:
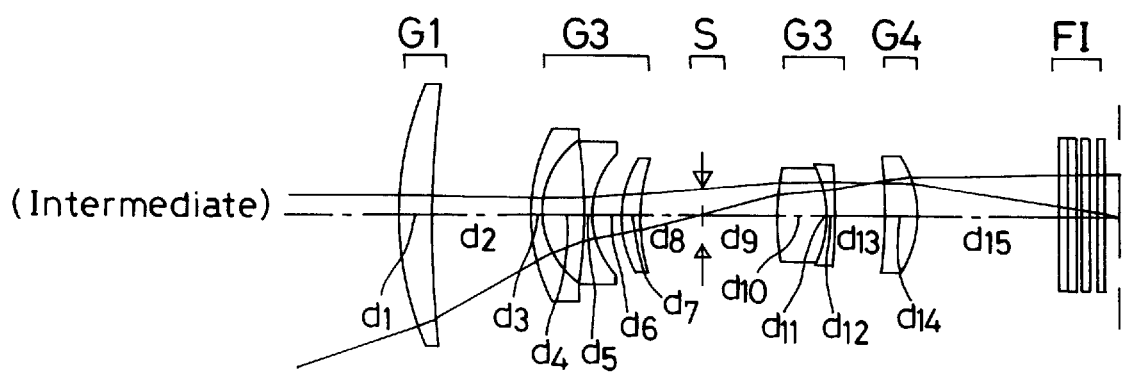
Figure 6C:
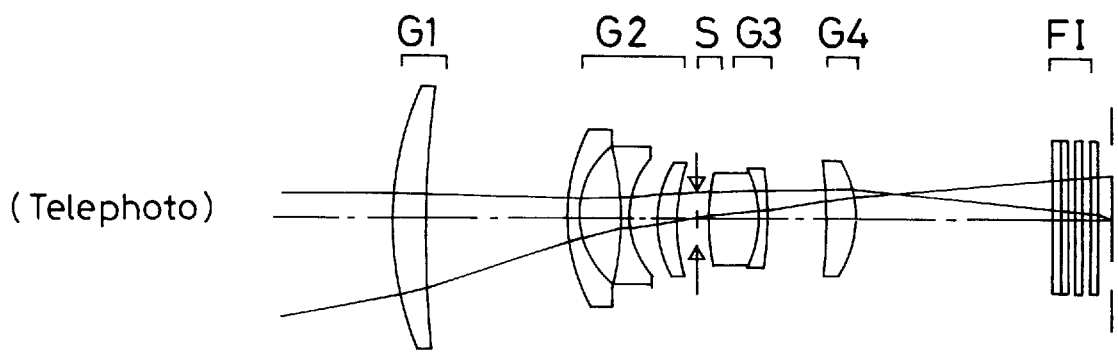

In Example 6, a first lens group G1 is made up of one positive meniscus lens that is convex on an object side of the zoom lens system; a second lens group G2 is made up of a negative meniscus lens that is convex on the object side, a double-concave lens and a positive meniscus lens that is convex on the object side, three lenses in all; a third lens group G3 is made up of a double-convex lens and a negative meniscus lens that is convex on an image side of the system, two lenses in all; a fourth lens group G4 is made up of one negative meniscus lens that is convex on the image side; and a stop S is located between the second and third lens groups G2 and G3, as shown in FIGS. 6A–6C. One aspheric surface is used for an object-side surface of the fourth lens group G4.

In Example 6, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

Figure 7A:
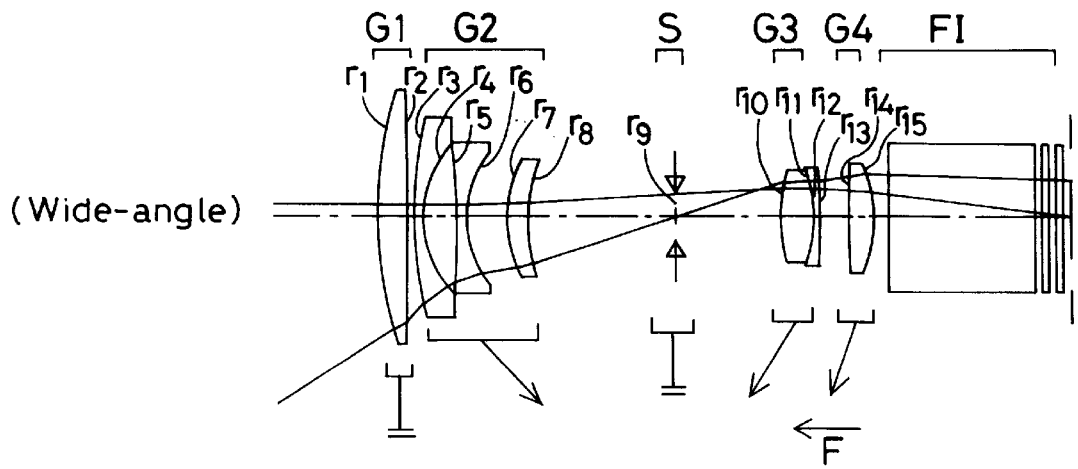
FIGS. 7A–7C are sectional schematics of the zoom lens system according to Example 7 of the invention.
Figure 7B:
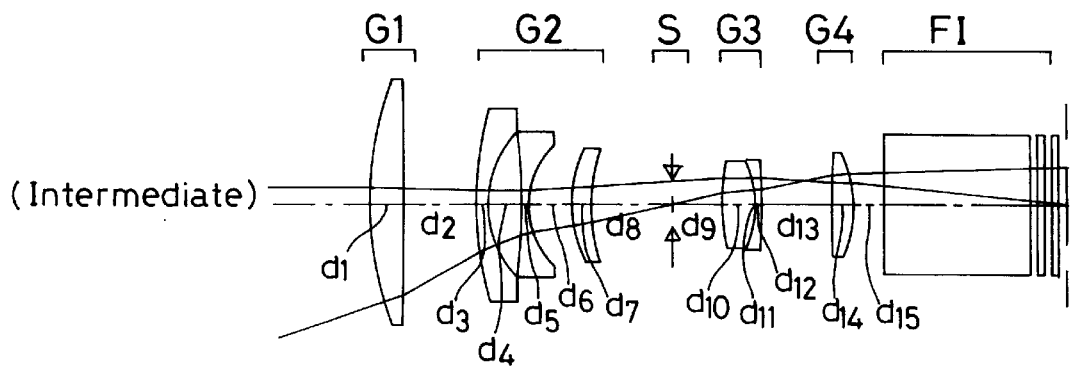
Figure 7C:
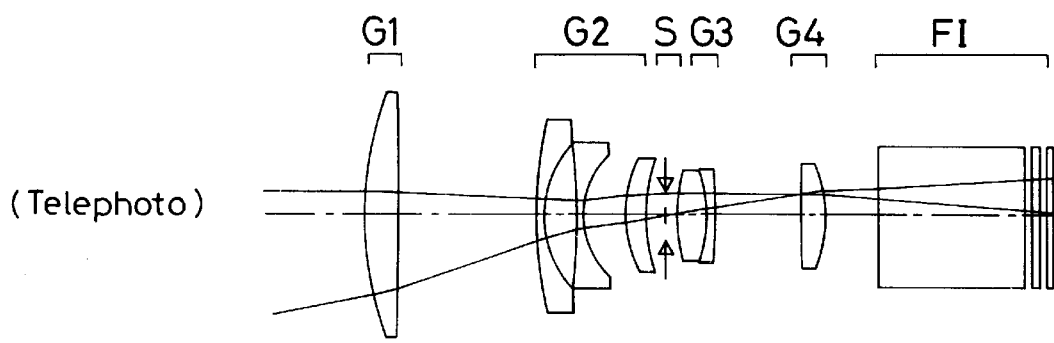

In Examples 7 and 8, a first lens group G1 is made up of one plano-convex lens convex on an object side of the zoom lens system; a second lens group G2 is made up of a negative meniscus lens that is convex on the object side, a double-concave lens and a positive meniscus lens that is convex on the object side, three lenses in all; a third lens group G3 is made up of a double-convex lens and a negative meniscus lens that is convex on an image side of the system, two lenses in all; a fourth lens group G4 is made up of one double-convex lens; and a stop S is located between the second and third lens groups G2 and G3, as shown in FIGS. 7A–7C. One aspheric surface is used for an object-side surface of the fourth lens group G4.

In Examples 7 and 8, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

Figure 8A:
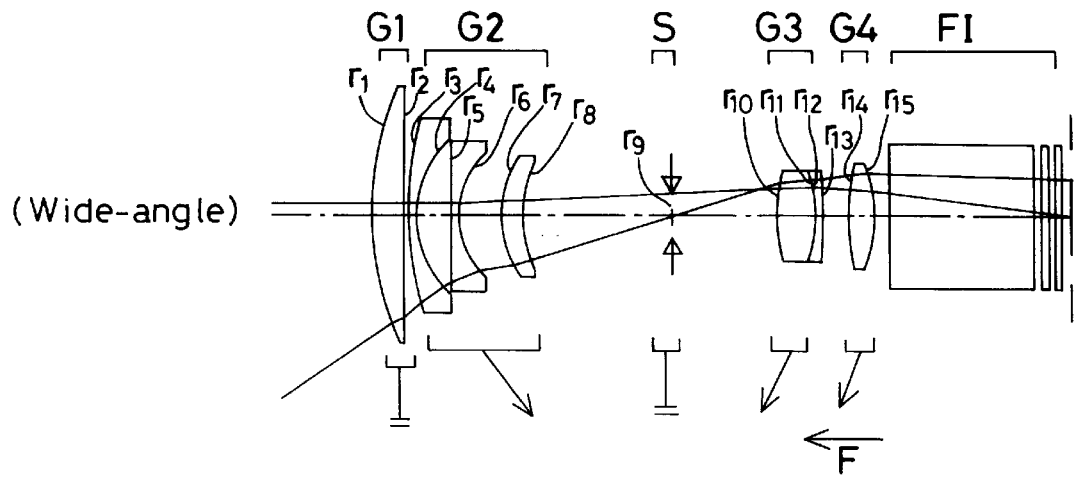
FIGS. 8A–8C are sectional schematics of the zoom lens system according to Example 9 of the invention.
Figure 8B:
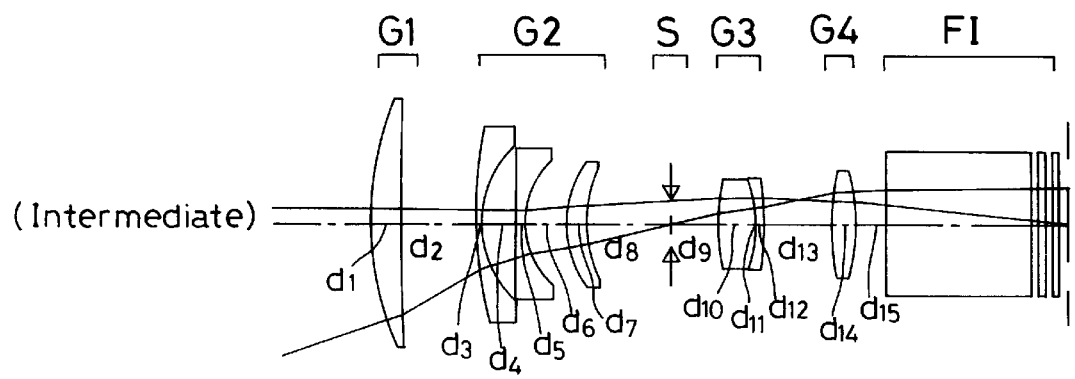
Figure 8C:
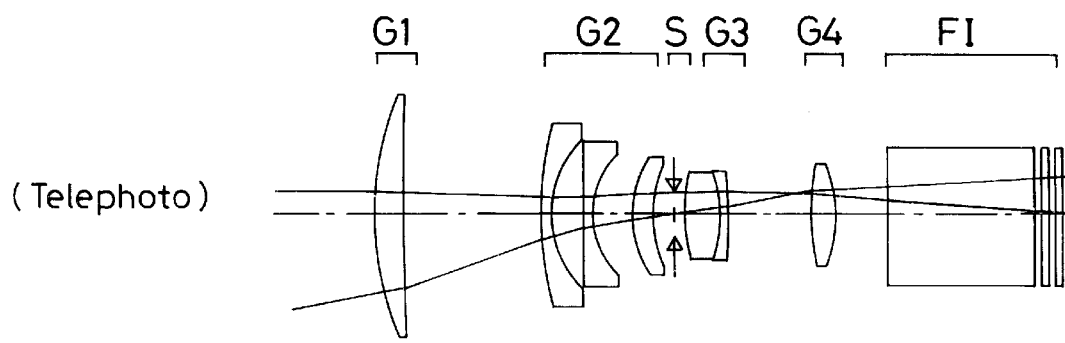

In Example 9, a first lens group G1 is made up of one positive meniscus lens that is convex on an object side of the zoom lens system; a second lens group G2 is made up of a negative meniscus lens that is convex on the object side, a negative meniscus lens that is convex on the object side and a positive meniscus lens convex on the object side, three lenses in all; a third lens group G3 is made up of a double-convex lens and a negative meniscus lens that is convex on an image side of the system, two lenses in all; a fourth lens group G4 is made up of one double-convex lens; and a stop S is located between the second and third lens groups G2 and G3, as shown in FIGS. 8A–8C. One aspheric surface is used for an image-side surface of the fourth lens group G4.

In Example 9, zooming from the wide-angle to telephoto end of the system is effected by moving the second lens group G2 toward the image side and the third and fourth lens groups G3 and G4 towards the object side, as shown. At any field angle position, focusing is effected by moving the fourth lens group G4 toward the object side.

In Examples 2 to 9, focusing may be effected by the second lens group G2, or the second plus fourth lens group G2 and G4 as is the case with Example 1. In Examples 1, 2, and 6–9, the negative lens in the second lens group G2 and the positive lens therein, which is located on the object side, are located with an air separation between them. However, these lenses may be cemented together to form a doublet.

Enumerated below are numerical data for each example. Symbols used hereinafter but not hereinbefore have the following meanings.

f focal length of the overall system $F_{NO}$ ... F-number

ω ... half angle of field $r_1$, $r_2$ radii of curvature of lens surfaces $d_1$, $d_2$ ... spaces between adjacent lens surfaces $n_{d1}$, $n_{d2}$, ... d-line refractive indices of lenses $v_{d1}$, $v_{d2}$, ... Abbe's number of lenses Here let x represent an optical axis of the system where the direction of propagation of light is positive, and y denote a direction perpendicular to the optical axis. Then, aspheric configuration is given by $$x=(y^2/r)[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4$, $A_6$, $A_8$ and $A_{10}$ are fourth, sixth, eighth and tenth aspherical coefficients.

In the following numerical data, lenses with a refractive index n=1.49241 and an Abbe's number υ=57.66 or n=1.49216 and υ=57.50 are plastic lenses.

Example 1
f = 8.900 ~ 15.400 ~ 26.699
$F_{NO}$ = 2.001 ~ 2.304 ~ 3.087
ω = 33.877° ~ 19.983° ~ 11.666°

| | |
|---|---|
| $r_1$ = 44.5313 | $d_1$ = 5.0000 $n_{d1}$ = 1.49241 $v_{d1}$ = 57.66 |
| $r_2$ = 235.4481 | $d_2$ = (Variable) |
| $r_3$ = 33.3406 | $d_3$ = 1.6000 $n_{d2}$ = 1.77250 $v_{d2}$ = 49.62 |
| $r_4$ = 10.5620 | $d_4$ = 9.1557 |
| $r_5$ = −25.6170 | $d_5$ = 1.5000 $n_{d3}$ = 1.48749 $v_{d3}$ = 70.44 |
| $r_6$ = 54.3610 | $d_6$ = 3.5000 $n_{d4}$ = 1.80279 $v_{d4}$ = 25.26 |
| $r_7$ = −173.1864 (Aspheric) | $d_7$ = (Variable) |
| $r_8$ = ∞ (Stop) | $d_8$ = (Variable) |
| $r_9$ = 34.4931 (Aspheric) | $d_9$ = 4.8000 $n_{d5}$ = 1.49241 $v_{d5}$ = 57.66 |
| $r_{10}$ = −19.8304 | $d_{10}$ = 0.1500 |
| $r_{11}$ = 10.4305 | $d_{11}$ = 4.7402 $n_{d6}$ = 1.60300 $v_{d6}$ = 65.48 |
| $r_{12}$ = 24.3138 | $d_{12}$ = 0.0772 |
| $r_{13}$ = 25.4055 | $d_{13}$ = 1.1165 $n_{d7}$ = 1.84666 $v_{d7}$ = 23.78 |
| $r_{14}$ = 8.6566 | $d_{14}$ = (Variable) |
| $r_{15}$ = 34.8911 | $d_{15}$ = 4.0000 $n_{d8}$ = 1.49241 $v_{d8}$ = 57.66 |
| $r_{16}$ = −21.9889 | $d_{16}$ = (Variable) |
| $r_{17}$ = ∞ | $d_{17}$ = 1.6000 $n_{d9}$ = 1.52420 $v_{d9}$ = 70.20 |
| $r_{18}$ = ∞ | $d_{18}$ = 2.6300 $n_{d10}$ = 1.54425 $v_{d10}$ = 67.00 |
| $r_{19}$ = ∞ | $d_{19}$ = 1.0000 |
| $r_{20}$ = ∞ | $d_{20}$ = 1.0000 $n_{d11}$ = 1.50000 $v_{d11}$ = 60.00 |
| $r_{21}$ = ∞ | |

Zooming Spaces

| f | 8.900 | 15.400 | 26.699 |
|---|---|---|---|
| $d_2$ | 1.000 | 13.278 | 19.838 |
| $d_7$ | 20.729 | 8.451 | 1.892 |
| $d_8$ | 13.551 | 8.628 | 1.444 |
| $d_{14}$ | 8.547 | 9.453 | 8.710 |
| $d_{16}$ | 5.970 | 9.988 | 17.915 |

Aspherical Coefficients

7$^{th}$ surface
K = 0.0000
$A_4$ = −2.0185 × 10$^{-5}$
$A_6$ = −1.0045 × 10$^{-7}$
$A_8$ = 2.1313 × 10$^{-9}$
$A_{10}$ = −1.7474 × 10$^{-11}$
9$^{th}$ Surface
K = 0.0000
$A_4$ = −5.7976 × 10$^{-5}$
$A_6$ = 1.4379 × 10$^{-7}$
$A_8$ = −2.0236 × 10$^{-9}$
$A^{10}$ = 6.3183 × 10$^{-12}$ Example 2
f = 8.900 ~ 15.400 ~ 26.700
$F_{NO}$ = 2.000 ~ 2.382 ~ 2.877

-continued $\omega = 33.588° \sim 20.245° \sim 11.934°$

| | |
|---|---|
| $r_1 = 51.1602$ (Aspheric) | $d_1 = 6.0000$ $n_{d1} = 1.49241$ $\nu_{d1} = 57.66$ |
| $r_2 = -340.7162$ | $d_2 =$ (Variable) |
| $r_3 = 105.0895$ | $d_3 = 2.0000$ $n_{d2} = 1.49241$ $\nu_{d2} = 57.66$ |
| $r_4 = 10.4665$ | $d_4 = 7.7608$ |
| $r_5 = -29.9386$ | $d_5 = 1.5050$ $n_{d3} = 1.49241$ $\nu_{d3} = 57.66$ |
| $r_6 = 33.9326$ (Aspheric) | $d_6 = 2.8972$ |
| $r_7 = 43.1092$ | $d_7 = 2.5000$ $n_{d4} = 1.84666$ $\nu_{d4} = 23.78$ |
| $r_8 = 184.3030$ | $d_8 =$ (Variable) |
| $r_9 = \infty$ (Stop) | $d_9 =$ (Variable) |
| $r_{10} = 24.1821$ (Aspheric) | $d_{10} = 4.7604$ $n_{d5} = 1.49241$ $\nu_{d5} = 57.66$ |
| $r_{11} = -30.7507$ | $d_{11} = 0.1500$ |
| $r_{12} = 10.1953$ | $d_{12} = 4.6184$ $n_{d6} = 1.56883$ $\nu_{d6} = 56.33$ |
| $r_{13} = 26.5327$ | $d_{13} = 0.1700$ |
| $r_{14} = 32.2596$ | $d_{14} = 1.1311$ $n_{d7} = 1.84666$ $\nu_{d7} = 23.78$ |
| $r_{15} = 8.6992$ | $d_{15} =$ (Variable) |
| $r_{16} = 18.2256$ (Aspheric) | $d_{16} = 4.5000$ $n_{d8} = 1.49241$ $\nu_{d8} = 57.66$ |
| $r_{17} = -27.7589$ | $d_{17} =$ (Variable) |
| $r_{18} = \infty$ | $d_{18} = 1.6000$ $n_{d9} = 1.52420$ $\nu_{d9} = 70.20$ |
| $r_{19} = \infty$ | $d_{19} = 2.6300$ $n_{d10} = 1.54425$ $\nu_{d10} = 67.00$ |
| $r_{20} = \infty$ | $d_{20} = 1.0000$ |
| $r_{21} = \infty$ | $d_{21} = 1.0000$ $n_{d11} = 1.50000$ $\nu_{d11} = 60.00$ |
| $r_{22} = \infty$ | |

Zooming Spaces

| f | 8.900 | 15.400 | 26.700 |
|---|---|---|---|
| $d_2$ | 1.000 | 11.686 | 20.458 |
| $d_8$ | 21.458 | 10.772 | 2.000 |
| $d_9$ | 14.257 | 7.512 | 2.000 |
| $d_{15}$ | 7.480 | 10.686 | 9.897 |
| $d_{17}$ | 7.577 | 11.116 | 17.417 |

Aspherical Coefficients $1^{st}$ surface
$K = 0.0000$
$A_4 = -1.1011 \times 10^{-6}$
$A_6 = -4.1613 \times 10^{-9}$
$A_8 = 1.1957 \times 10^{-11}$
$A_{10} = -1.5633 \times 10^{-14}$
$6^{th}$ Surface
$K = 0.0000$
$A_4 = -4.6385 \times 10^{-5}$
$A_6 = -5.6702 \times 10^{-8}$
$A_8 = 2.8259 \times 10^{-9}$
$A_{10} = -2.5546 \times 10^{-11}$
$10^{th}$ Surface
$K = 0.0000$
$A_4 = -3.2121 \times 10^{-5}$
$A_6 = 5.1978 \times 10^{-10}$
$A_8 = -2.2641 \times 10^{-10}$
$A_{10} = 8.2732 \times 10^{-13}$
$16^{th}$ Surface
$K = 0.0000$
$A_4 = -3.1628 \times 10^{-5}$
$A_6 = 1.5533 \times 10^{-8}$
$A^8 = 1.6602 \times 10^{-10}$
$A^{10} = -3.2434 \times 10^{-12}$ Example 3
$f = 8.900 \sim 15.400 \sim 26.700$
$F_{NO} = 2.800 \sim 3.363 \sim 4.246$
$\omega = 33.647° \sim 19.906° \sim 11.784°$

| | |
|---|---|
| $r_1 = 110.2121$ (Aspheric) | $d_1 = 6.0000$ $n_{d1} = 1.49216$ $\nu_{d1} = 57.50$ |
| $r_2 = -64.6133$ | $d_2 =$ (Variable) |
| $r_3 = -126.0608$ | $d_3 = 1.6000$ $n_{d2} = 1.49216$ $\nu_{d2} = 57.50$ |
| $r_4 = 14.0489$ (Aspheric) | $d_4 = 11.0637$ |
| $r_5 = -12.0152$ | $d_5 = 1.5000$ $n_{d3} = 1.48749$ $\nu_{d3} = 70.21$ |
| $r_6 = -168.0278$ | $d_6 = 2.0000$ $n_{d4} = 1.84666$ $\nu_{d4} = 23.78$ |
| $r_7 = -37.6785$ | $d_7 =$ (Variable) |
| $r_8 = \infty$ (Stop) | $d_8 =$ (Variable) |
| $r_9 = 10.2335$ (Aspheric) | $d_9 = 7.4642$ $n_{d5} = 1.49216$ $\nu_{d5} = 57.50$ |
| $r_{10} = -31.1103$ | $d_{10} = 0.1500$ |
| $r_{11} = 31.1135$ | $d_{11} = 1.0000$ $n_{d6} = 1.84666$ $\nu_{d6} = 23.78$ |
| $r_{12} = 10.3337$ | $d_{12} =$ (Variable) |
| $r_{13} = 15.4408$ (Aspheric) | $d_{13} = 4.5000$ $n_{d7} = 1.49216$ $\nu_{d7} = 57.50$ |
| $r_{14} = -32.4998$ | $d_{14} =$ (Variable) |
| $r_{15} = \infty$ | $d_{15} = 1.6000$ $n_{d8} = 1.52420$ $\nu_{d8} = 70.21$ |
| $r_{16} = \infty$ | $d_{16} = 2.6300$ $n_{d9} = 1.54425$ $\nu_{d9} = 67.01$ |
| $r_{17} = \infty$ | $d_{17} = 1.0000$ |
| $r_{18} = \infty$ | $d_{18} = 1.0000$ $n_{d10} = 1.50000$ $\nu_{d10} = 60.01$ |
| $r_{19} = \infty$ | |

Zooming Spaces

| f | 8.900 | 15.400 | 26.700 |
|---|---|---|---|
| $d_2$ | 1.022 | 10.519 | 17.595 |
| $d_7$ | 18.573 | 9.076 | 2.000 |
| $d_8$ | 13.776 | 6.666 | 2.000 |
| $d_{12}$ | 4.445 | 7.421 | 5.748 |
| $d_{14}$ | 11.868 | 16.001 | 22.341 |

Aspherical Coefficients $1^{st}$ surface
$K = 0.0000$
$A_4 = -5.4607 \times 10^{-6}$
$A_6 = 8.7595 \times 10^{-10}$
$A_8 = 1.4591 \times 10^{-11}$
$A_{10} = -4.0171 \times 10^{-14}$
$4^{th}$ Surface
$K = 0.0000$
$A_4 = -5.9752 \times 10^{-5}$
$A_6 = -1.1184 \times 10^{-7}$
$A_8 = -2.6701 \times 10^{-9}$
$A_{10} = -6.9575 \times 10^{-12}$
$9^{th}$ Surface
$K = 0.0000$
$A_4 = -1.1563 \times 10^{-4}$
$A_6 = -5.8566 \times 10^{-7}$
$A_8 = -3.0848 \times 10^{-9}$
$A_{10} = -4.8687 \times 10^{-11}$
$13^{th}$ Surface
$K = 0.0000$
$A_4 = -5.1534 \times 10^{-5}$
$A_6 = 1.9734 \times 10^{-7}$
$A_8 = -7.5561 \times 10^{-9}$
$A_{10} = 7.3471 \times 10^{-11}$ Example 4
$f = 8.900 \sim 15.400 \sim 26.700$
$F_{NO} = 2.803 \sim 3.273 \sim 4.352$
$\omega = 33.979° \sim 19.754° \sim 11.714°$

| | |
|---|---|
| $r_1 = 57.4208$ (Aspheric) | $d_1 = 6.0000$ $n_{d1} = 1.49241$ $\nu_{d1} = 57.66$ |
| $r_2 = -123.0099$ | $d_2 =$ (Variable) |
| $r_3 = 63.5577$ | $d_3 = 1.6000$ $n_{d2} = 1.69680$ $\nu_{d2} = 55.53$ |
| $r_4 = 14.2834$ | $d_4 = 6.2586$ |
| $r_5 = -21.1750$ | $d_5 = 2.0000$ $n_{d3} = 1.49241$ $\nu_{d3} = 57.66$ |
| $r_6 = 21.5395$ | $d_6 = 4.0013$ |
| $r_7 = 27.4483$ | $d_7 = 2.0000$ $n_{d4} = 1.84666$ $\nu_{d4} = 23.78$ |
| $r_8 = 61.9967$ | $d_8 =$ (Variable) |
| $r_9 = \infty$ (Stop) | $d_9 =$ (Variable) |
| $r_{10} = 10.1242$ (Aspheric) | $d_{10} = 6.4751$ $n_{d5} = 1.49241$ $\nu_{d5} = 57.66$ |
| $r_{11} = -33.1255$ | $d_{11} = 0.1500$ |
| $r_{12} = 37.2082$ | $d_{12} = 1.0000$ $n_{d6} = 1.84666$ $\nu_{d6} = 23.78$ |
| $r_{13} = 11.0517$ | $d_{13} =$ (Variable) |
| $r_{14} = 19.5986$ (Aspheric) | $d_{14} = 4.5000$ $n_{d7} = 1.49241$ $\nu_{d7} = 57.66$ |
| $r_{15} = -24.6901$ | $d_{15} =$ (Variable) |
| $r_{16} = \infty$ | $d_{16} = 1.1400$ $n_{d8} = 1.54771$ $\nu_{d8} = 62.84$ |
| $r_{17} = \infty$ | $d_{17} = 0.8100$ $n_{d9} = 1.54771$ $\nu_{d9} = 62.84$ |
| $r_{18} = \infty$ | $d_{18} = 1.0000$ |
| $r_{19} = \infty$ | $d_{19} = 1.6000$ $n_{d10} = 1.51400$ $\nu_{d10} = 75.00$ |
| $r_{20} = \infty$ | |

Zooming Spaces

| f | 8.900 | 15.400 | 26.700 |
|---|---|---|---|
| $d_2$ | 1.686 | 11.413 | 17.062 |
| $d_8$ | 17.393 | 7.667 | 2.000 |
| $d_9$ | 14.398 | 8.430 | 2.000 |
| $d_{13}$ | 5.422 | 7.135 | 6.302 |

|  | $d_{15}$ | 14.789 | 19.045 | 26.325 |
|---|---|---|---|---|

Aspherical Coefficients

1st surface
K = 0.0000
$A_4 = -2.5737 \times 10^{-6}$
$A_6 = 3.4236 \times 10^{-9}$
$A_8 = 3.3566 \times 10^{-12}$
$A_{10} = -2.4726 \times 10^{-14}$
10th Surface
K = 0.0000
$A_4 = -1.2078 \times 10^{-4}$
$A_6 = -9.4584 \times 10^{-7}$
$A_8 = 8.7354 \times 10^{-9}$
$A_{10} = -1.7356 \times 10^{-10}$
14th Surface
K = 0.0000
$A_4 = -4.3466 \times 10^{-5}$
$A_6 = -1.1251 \times 10^{-7}$
$A_8 = 3.8242 \times 10^{-9}$
$A_{10} = -3.8018 \times 10^{-11}$ Example 5
f = 8.900 ~ 15.400 ~ 26.699
$F_{NO}$ = 2.803 ~ 3.020 ~ 4.416
ω = 34.195° ~ 20.020° ~ 11.708°

$r_1 = 43.7492$     $d_1 = 5.0000$ $n_{d1} = 1.69680$ $v_{d1} = 55.53$
$r_2 = 161.9148$    $d_2$ = (Variable)
$r_3 = 24.2833$     $d_3 = 1.6000$ $n_{d2} = 1.69680$ $v_{d2} = 55.53$
$r_4 = 12.8835$     $d_4 = 5.2105$
$r_5 = -57.3267$    $d_5 = 1.3000$ $n_{d3} = 1.69680$ $v_{d3} = 55.53$
$r_6 = 14.5752$     $d_6 = 4.5523$
$r_7 = 17.8323$     $d_7 = 2.0000$ $n_{d4} = 1.84666$ $v_{d4} = 23.78$
$r_8 = 27.1091$     $d_8$ = (Variable)
$r_9 = \infty$ (Stop)   $d_9$ = (Variable)
$r_{10} = 10.7156$(Aspheric)  $d_{10} = 5.0000$ $n_{d5} = 1.49241$ $v_{d5} = 57.66$
$r_{11} = -28.6168$   $d_{11} = 0.1500$
$r_{12} = 50.1240$    $d_{12} = 1.0000$ $n_{d6} = 1.84666$ $v_{d6} = 23.78$
$r_{13} = 13.1907$    $d_{13}$ = (Variable)
$r_{14} = 29.0560$(Aspheric)  $d_{14} = 4.5000$ $n_{d7} = 1.49241$ $v_{d7} = 57.66$
$r_{15} = -19.9778$   $d_{15}$ = (Variable)
$r_{16} = \infty$     $d_{16} = 1.1400$ $n_{d8} = 1.54771$ $v_{d8} = 62.84$
$r_{17} = \infty$     $d_{17} = 0.8100$ $n_{d9} = 1.54771$ $v_{d9} = 62.84$
$r_{18} = \infty$     $d_{18} = 1.0000$
$r_{19} = \infty$     $d_{19} = 1.6000$ $n_{d10} = 1.51400$ $v_{d10} = 75.00$
$r_{20} = \infty$ Zooming Spaces

| f | 8.900 | 15.400 | 26.699 |
|---|---|---|---|
| $d_2$ | 1.000 | 12.535 | 16.106 |
| $d_8$ | 18.799 | 7.264 | 3.693 |
| $d_9$ | 15.637 | 12.496 | 2.000 |
| $d_{13}$ | 5.363 | 5.029 | 7.764 |
| $d_{15}$ | 14.952 | 18.427 | 26.188 |

Aspherical Coefficients

10th surface
K = 0.0000
$A_4 = -1.3295 \times 10^{-4}$
$A_6 = -4.9679 \times 10^{-7}$
$A_8 = -9.0848 \times 10^{-10}$
$A_{10} = -4.5990 \times 10^{-11}$
14th Surface
K = 0.0000
$A_4 = -4.7875 \times 10^{-5}$
$A_6 = -1.9958 \times 10^{-8}$
$A_8 = 2.8214 \times 10^{-9}$
$A_{10} = -1.2863 \times 10^{-11}$ Example 6
f = 9.000 ~ 15.590 ~ 27.000
$F_{NO}$ = 2.800 ~ 3.030 ~ 4.069
ω = 33.547° ~ 19.731° ~ 11.515°

$r_1 = 44.5137$     $d_1 = 4.4000$ $n_{d1} = 1.69680$ $v_{d1} = 55.53$
$r_2 = 137.7320$    $d_2$ = (Variable)
$r_3 = 23.5602$     $d_3 = 1.6000$ $n_{d2} = 1.69680$ $v_{d2} = 55.53$
$r_4 = 12.0406$     $d_4 = 5.7412$
$r_5 = -54.8255$    $d_5 = 1.5000$ $n_{d3} = 1.56384$ $v_{d3} = 60.70$
$r_6 = 13.6238$     $d_6 = 3.8135$
$r_7 = 16.0196$     $d_7 = 2.2000$ $n_{d4} = 1.84666$ $v_{d4} = 23.78$
$r_8 = 23.3091$     $d_8$ = (Variable)
$r_9 = \infty$ (Stop)   $d_9$ = (Variable)
$r_{10} = 31.1300$    $d_{10} = 6.5179$ $n_{d5} = 1.77250$ $v_{d5} = 49.60$
$r_{11} = -15.0403$   $d_{11} = 0.1939$
$r_{12} = -13.3787$   $d_{12} = 0.8893$ $n_{d6} = 1.84666$ $v_{d6} = 23.78$
$r_{13} = -65.0570$   $d_{13}$ = (Variable)
$r_{14} = 2370.3961$(Aspheric)  $d_{14} = 4.3000$ $n_{d7} = 1.49241$ $v_{d7} = 57.66$
$r_{15} = -14.2694$   $d_{15}$ = (Variable)
$r_{16} = \infty$     $d_{16} = 1.1400$ $n_{d8} = 1.54771$ $v_{d8} = 62.84$
$r_{17} = \infty$     $d_{17} = 0.8100$ $n_{d9} = 1.54771$ $v_{d9} = 62.84$
$r_{18} = \infty$     $d_{18} = 1.0000$
$r_{19} = \infty$     $d_{19} = 1.0000$ $n_{d10} = 1.51000$ $v_{d10} = 75.00$
$r_{20} = \infty$     $d_{20} = 1.0000$
$r_{21} = \infty$     $d_{21} = 0.8000$ $n_{d11} = 1.52300$ $v_{d11} = 55.00$
$r_{22} = \infty$ Zooming Spaces

| f | 9.000 | 15.590 | 27.000 |
|---|---|---|---|
| $d_2$ | 1.000 | 13.349 | 18.974 |
| $d_8$ | 20.474 | 8.125 | 2.500 |
| $d_9$ | 13.221 | 9.796 | 2.000 |
| $d_{13}$ | 6.416 | 6.356 | 7.516 |
| $d_{15}$ | 15.209 | 18.694 | 25.330 |

Aspherical Coefficients

14th surface
K = 0.0000
$A_4 = -7.8946 \times 10^{-5}$
$A_6 = 3.2441 \times 10^{-8}$
$A_8 = -1.6090 \times 10^{-9}$
$A_{10} = 1.6631 \times 10^{-11}$ Example 7
f = 9.000 ~ 15.590 ~ 27.000
$F_{NO}$ = 2.800 ~ 3.418 ~ 4.082
ω = 33.124° ~ 19.148° ~ 11.239°

$r_1 = 56.3926$     $d_1 = 4.5069$ $n_{d1} = 1.69680$ $v_{d1} = 55.53$
$r_2 = \infty$      $d_2$ = (Variable)
$r_3 = 61.3654$     $d_3 = 1.6283$ $n_{d2} = 1.60311$ $v_{d2} = 60.64$
$r_4 = 16.8440$     $d_4 = 4.4851$
$r_5 = -118.1919$   $d_5 = 1.3820$ $n_{d3} = 1.51633$ $v_{d3} = 64.14$
$r_6 = 14.0448$     $d_6 = 5.9891$
$r_7 = 18.2335$     $d_7 = 3.0078$ $n_{d4} = 1.84666$ $v_{d4} = 23.78$
$r_8 = 25.3491$     $d_8$ = (Variable)
$r_9 = \infty$ (Stop)   $d_9$ = (Variable)
$r_{10} = 28.4847$    $d_{10} = 4.7270$ $n_{d5} = 1.72916$ $v_{d5} = 54.68$
$r_{11} = -18.6604$   $d_{11} = 0.1186$
$r_{12} = -17.0347$   $d_{12} = 0.9000$ $n_{d6} = 1.84666$ $v_{d6} = 23.78$
$r_{13} = -75.5981$   $d_{13}$ = (Variable)
$r_{14} = 114.2180$(Aspheric)  $d_{14} = 3.4652$ $n_{d7} = 1.56384$ $v_{d7} = 60.67$
$r_{15} = -19.3116$   $d_{15}$ = (Variable)
$r_{16} = \infty$     $d_{16} = 21.000$ $n_{d8} = 1.51633$ $v_{d8} = 64.14$
$r_{17} = \infty$     $d_{17} = 1.0000$
$r_{18} = \infty$     $d_{18} = 1.0000$ $n_{d9} = 1.51000$ $v_{d9} = 75.00$
$r_{19} = \infty$     $d_{19} = 1.0000$
$r_{20} = \infty$     $d_{20} = 0.8000$ $n_{d10} = 1.52300$ $v_{d10} = 55.00$
$r_{21} = \infty$ Zooming Spaces

| f | 9.000 | 15.590 | 27.000 |
|---|---|---|---|
| $d_2$ | 1.000 | 10.862 | 19.927 |

-continued

| | | | |
|---|---|---|---|
| $d_8$ | 21.927 | 12.065 | 3.000 |
| $d_9$ | 15.138 | 7.434 | 1.500 |
| $d_{13}$ | 4.178 | 10.022 | 12.418 |
| $d_{15}$ | 2.000 | 3.861 | 7.399 |

Aspherical Coefficients

14th surface
K = 0.0000
$A_4 = -5.3935 \times 10^{-5}$
$A_6 = 4.1946 \times 10^{-8}$
$A_8 = -9.5303 \times 10^{-10}$
$A_{10} = 1.0291 \times 10^{-11}$ Example 8
f = 9.000 ~ 15.590 ~ 27.000
$F_{NO}$ = 2.800 ~ 3.374 ~ 3.983
ω = 33.059° ~ 19.210° ~ 11.236°

$r_1$ = 40.4069       $d_1$ = 5.7000 $n_{d1}$ = 1.51633 $v_{d1}$ = 64.14
$r_2$ = ∞             $d_2$ = (Variable)
$r_3$ = 79.0345       $d_3$ = 1.3923 $n_{d2}$ = 1.51633 $v_{d2}$ = 64.14
$r_4$ = 14.8002       $d_4$ = 4.6342
$r_5$ = −1666.9155    $d_5$ = 1.3650 $n_{d3}$ = 1.51633 $v_{d3}$ = 64.14
$r_6$ = 13.5757       $d_6$ = 5.9493
$r_7$ = 15.7490       $d_7$ = 2.5019 $n_{d4}$ = 1.84666 $v_{d4}$ = 23.78
$r_8$ = 20.2359       $d_8$ = (Variable)
$r_9$ = ∞ (Stop)      $d_9$ = (Variable)
$r_{10}$ = 29.5959    $d_{10}$ = 5.0728 $n_{d5}$ = 1.72916 $v_{d5}$ = 54.68
$r_{11}$ = −18.7064   $d_{11}$ = 0.1647
$r_{12}$ = −16.5207   $d_{12}$ = 0.8000 $n_{d6}$ = 1.84666 $v_{d6}$ = 23.78
$r_{13}$ = −72.5622   $d_{13}$ = (Variable)
$r_{14}$ = 104.1454 (Aspheric)  $d_{14}$ = 3.3133 $n_{d7}$ = 1.56384 $v_{d7}$ = 60.67
$r_{15}$ = −17.9843   $d_{15}$ = (Variable)
$r_{16}$ = ∞          $d_{16}$ = 21.0000 $n_{d8}$ = 1.51633 $v_{d8}$ = 64.14
$r_{17}$ = ∞          $d_{17}$ = 1.0000
$r_{18}$ = ∞          $d_{18}$ = 1.0000 $n_{d9}$ = 1.51000 $v_{d9}$ = 75.00
$r_{19}$ = ∞          $d_{19}$ = 1.0000
$r_{20}$ = ∞          $d_{20}$ = 0.8000 $n_{d10}$ = 1.52300 $v_{d10}$ = 55.00
$r_{21}$ = ∞

Zooming Spaces

| f | 9.000 | 15.590 | 27.000 |
|---|---|---|---|
| $d_2$ | 1.000 | 10.882 | 19.890 |
| $d_8$ | 21.890 | 12.007 | 3.000 |
| $d_9$ | 15.023 | 7.392 | 1.500 |
| $d_{13}$ | 4.179 | 9.875 | 12.500 |
| $d_{15}$ | 2.000 | 3.936 | 7.202 |

Aspherical Coefficients

14th surface
K = 0.0000
$A_4 = -5.7408 \times 10^{-5}$
$A_6 = 8.5612 \times 10^{-8}$
$A_8 = -1.6458 \times 10^{-9}$
$A_{10} = 1.4584 \times 10^{-11}$ Example 9
f = 9.000 ~ 15.590 ~ 27.000
$F_{NO}$ = 2.8000 ~ 3.446 ~ 4.061
ω = 33.406° ~ 19.438° ~ 11.236°

$r_1$ = 47.9309       $d_1$ = 4.1132 $n_{d1}$ = 1.69680 $v_{d1}$ = 55.53
$r_2$ = 304.2787      $d_2$ = (Variable)
$r_3$ = 59.1093       $d_3$ = 1.2594 $n_{d2}$ = 1.60311 $v_{d2}$ = 60.64
$r_4$ = 15.9873       $d_4$ = 4.7799
$r_5$ = 490.2684      $d_5$ = 1.4164 $n_{d3}$ = 1.51633 $v_{d3}$ = 64.14
$r_6$ = 13.5482       $d_6$ = 6.0175
$r_7$ = 16.3190       $d_7$ = 2.9760 $n_{d4}$ = 1.84666 $v_{d4}$ = 23.78
$r_8$ = 20.7246       $d_8$ = (Variable)
$r_9$ = ∞ (Stop)      $d_9$ = (Variable)

-continued $r_{10}$ = 31.1535    $d_{10}$ = 5.5140 $n_{d5}$ = 1.72916 $v_{d5}$ = 54.68
$r_{11}$ = −18.5118   $d_{11}$ = 0.0831
$r_{12}$ = −17.3577   $d_{12}$ = 0.8000 $n_{d6}$ = 1.84666 $v_{d6}$ = 23.78
$r_{13}$ = −79.0486   $d_{13}$ = (Variable)
$r_{14}$ = 47.4747    $d_{14}$ = 3.5000 $n_{d7}$ = 1.56384 $v_{d7}$ = 60.67
$r_{15}$ = −23.9047 (Aspheric)  $d_{15}$ = (Variable)
$r_{16}$ = ∞          $d_{16}$ = 21.0000 $n_{d8}$ = 1.51633 $v_{d8}$ = 64.14
$r_{17}$ = ∞          $d_{17}$ = 1.0000
$r_{18}$ = ∞          $d_{18}$ = 1.0000 $n_{d9}$ = 1.51000 $v_{d9}$ = 75.00
$r_{19}$ = ∞          $d_{19}$ = 1.0000
$r_{20}$ = ∞          $d_{20}$ = 0.8000 $n_{d10}$ = 1.52300 $v_{d10}$ = 55.00
$r_{21}$ = ∞

Zooming Spaces

| f | 9.000 | 15.590 | 27.000 |
|---|---|---|---|
| $d_2$ | 1.000 | 10.623 | 19.994 |
| $d_8$ | 21.994 | 12.372 | 3.000 |
| $d_9$ | 15.439 | 7.106 | 1.500 |
| $d_{13}$ | 3.903 | 10.222 | 12.287 |
| $d_{15}$ | 2.000 | 4.014 | 7.555 |

Aspherical Coefficients

15th surface
K = 0.0000
$A_4 = 4.3107 \times 10^{-5}$
$A_6 = -1.5950 \times 10^{-7}$
$A_8 = 3.2657 \times 10^{-9}$
$A_{10} = -2.6829 \times 10^{-11}$ FIGS. 9A–9L, 10A–10L, and 11A–11L are aberration diagrams of Example 1 upon being focused at infinity, at an intermediate short distance by the movement of the fourth lens group G4, and at a shorter distance by the movement of the fourth plus second lens groups G4 plus G2, with abbreviations SA, AS, DT, CC, and I representing spherical abberation, astigmatism, distortion, chromatic aberration of magnification, and image height, respectively.

Tabulated below are values of conditions (1) to (4) in Examples 1 to 9.

| | Cond.(1) | Cond.(2) | Cond.(3) | Cond.(4) |
|---|---|---|---|---|
| Ex. 1 | −0.64 | 0.25 | 1.83 | 0.080 |
| 2 | −0.63 | 0.25 | 1.51 | 0.098 |
| 3 | −0.71 | 0.26 | 1.61 | 0.106 |
| 4 | −0.81 | 0.29 | 1.67 | 0.111 |
| 5 | −0.90 | 0.29 | 1.69 | 0.105 |
| 6 | −0.62 | 0.32 | 1.61 | 0.097 |
| 7 | −0.72 | 0.37 | 1.29 | 0.111 |
| 8 | −0.72 | 0.35 | 1.21 | 0.115 |
| 9 | −0.73 | 0.35 | 1.28 | 0.111 |

As can be appreciated from the foregoing explanation, the present invention can provide a zoom lens system which achieves a wide angle of field, has a simplified construction, and is suitable for use on video cameras.

$$0 < ff_1 < 0.13, \quad (4\text{-}2)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end, where $f_W$ is the focal length of the overall zoom lens system at the wide-angle end.

What is claimed is:

1. A zoom lens system comprising, in order from an object side;

a first lens group having a positive refracting power;

a second lens group having a negative refracting power;

a third lens group having a positive refracting power; and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, said second lens group including at least one positive lens, and said third lens group including at least one negative lens.

2. A zoom lens system according to claim 1, wherein at least said second lens group is movable for focusing.

3. A zoom lens system according to claim 1, which satisfies the following condition (1):

$$-2.5 < z_3/z_2 < -0.45 \text{ where } z_2 > 0 \text{ and } z_3 < 0 \qquad (1)$$

where $z_i$ for i=2 or 3 is an amount of movement of an i-th lens group from the wide-angle to telephoto end with the proviso that a plus sign means movement of said lens group from the object side to an image side thereof.

4. A zoom lens system according to claim 1, which satisfies the following condition (2):

$$0.05 < f_4/f_1 < 0.41 \qquad (2)$$

where fi for i=1 or 4 is a focal length of an i-th lens group.

5. A zoom lens system according to claim 1, which satisfies the following condition (3):

$$0.9 < (\beta_{34T}/\beta_{34W})/(\beta_{2T}/\beta_{2W}) < 4 \qquad (3)$$

where $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end.

6. A zoom lens system according to claim 1, which satisfies the following conditions (1) and (2):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

where $z_i$ for i=2 or 3 is an amount of movement of an i-th lens group from the wide-angle to telephoto end with the proviso that a plus sign means movement of said lens group from the object side to an image side thereof, and fi for i=1 or 4 is a focal length of said i-th lens group.

7. A zoom lens system according to claim 1, which satisfies the following conditions (1), (2), and (3):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

$$0.9 < (\beta_{34T}/\beta_{34W})/(\beta_{2T}/\beta_{2W}) < 4 \qquad (3)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end.

8. A zoom lens system according to claim 1, which satisfies the following conditions (1), (2), (3), and (4):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

$$0.9 < (\beta_{34T}/\beta_{34W})/(\beta_{2T}/\beta_{2W}) < 4 \qquad (3)$$

$$0 < f_W/f_1 < 0.2 \qquad (4)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, $\beta_{34T}$ is a composite magnification of said third and fourth lens groups at the telephoto end, and $f_W$ is a focal length of the overall zoom lens system at the wide-angle end.

9. A zoom lens system according to claim 1, characterized in that only said second lens group is moved for focusing, which movement is towards the object side.

10. A zoom lens system comprising, in order from an object side;

a first lens group having a positive refracting power;

a second lens group having a negative refracting power;

a third lens group having a positive refracting power, and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, said second lens group including at least one positive lens, said third lens group including at least one negative lens, and said fourth lens group consisting only of a positive single lens.

11. A zoom lens system comprising, in order from an object side:

a first lens group having a positive refracting power;

a second lens group having a negative refracting power;

a stop;

a third lens group having a positive refracting power; and a fourth lens group having a positive refracting power, said second lens group moving toward an image side thereof and said third and fourth lens groups move constantly toward said object side, while said first lens group and stop remain fixed, for zooming from a wide-angle end thereof to a telephoto end thereof, said first lens group consisting only of a positive single lens, said second lens group including at least one positive lens, said third lens group including at least one negative lens, and said fourth lens group consisting only of a positive single lens.

12. A zoom lens system according to claim 10 or 11, wherein at least said second lens group is movable for focusing.

13. A zoom lens system according to claim 10 or 11, which satisfies the following condition (1):

$$-2.5 < z_3/z_2 < -0.45 \text{ where } z_2 > 0 \text{ and } z_3 < 0 \qquad (1)$$

where $z_i$ for i=2 or 3 is an amount of movement of an i-th lens group from the wide-angle to telephoto end with the proviso that a plus sign means movement of said lens group from the object side to an image side thereof.

14. A zoom lens system according to claim 10 or 11, which satisfies the following condition (2):

$$0.05 < f_4/f_1 < 0.41 \qquad (2)$$

where fi for i=1 or 4 is a focal length of an i-th lens group.

15. A zoom lens system according to claim 10 or 11, which satisfies the following condition (3):

$$0.9 < (\beta_{34T}/\beta_{34W})/(\beta_{2T}/\beta_{2W}) < 4 \qquad (3)$$

where $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end.

16. A zoom lens system according to claim 10 or 11, which satisfies the following conditions (1) and (2):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

where $z_i$ for i=2 or 3 is an amount of movement of an i-th lens group from the wide-angle to telephoto end with the proviso that a plus sign means movement of said lens group from the object side to an image side thereof, and fi for i=1 or 4 is a focal length of said i-th lens group.

17. A zoom lens system according to claim 10 or 11, which satisfies the following conditions (1), (2), and (3):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

$$0.9 < (\beta_{34T}/\beta_{34W})/(\beta_{2T}/\beta_{2W}) < 4 \qquad (3)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end.

18. A zoom lens system according to claim 10 or 11, which satisfies the following conditions (1), (2), (3), and (4):

$$-2.5 < z_3/z_2 < -0.45 \text{ where } z_2 > 0 \text{ and } z_3 < 0 \qquad (1)$$

$$0.05 < f_4/f_1 < 0.41 \qquad (2)$$

$$0.9 < (\beta_{34T}/\beta_{34W})/(\beta_{2T}/\beta_{2W}) < 4 \qquad (3)$$

$$0 < f_W/f_1 < 0.2 \qquad (4)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, $\beta_{34T}$ is a composite magnification of said third and fourth lens groups at the telephoto end, and $f_W$ is a focal length of the overall zoom lens system at the wide-angle end.

19. A zoom lens system according to claim 10 or 11, characterized in that only said second lens group is moved for focusing, which movement is towards the object side.

20. A zoom lens system according to claim 10 or 11, characterized by satisfying the following conditions (1), (2), (3), and (4-2):

$$-2.5 < z_3/z_2 < 0.45 \text{ where } z_2 > 0 \text{ and } z_3 < 0 \qquad (1)$$

$$0.05 < f_4/f_1 < 0.41 \qquad (2)$$

$$0.9 < (\beta_{34T}/\beta_{34W})/(\beta_{2T}/\beta_{2W}) < 4 \qquad (3)$$

$$0 < f_W/f_1 < 0.13, \qquad (4\text{-}2)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end, where $f_W$ is the focal length of the overall zoom lens system at the wide-angle end.

21. A zoom lens system according to claim 10 or 11, characterized by satisfying the following condition (4-2):

$$0 < f_W/f_1 < 0.13 \qquad (4\text{-}2)$$

where $f_W$ is the focal length of the overall zoom lens system at the wide-angle end, and $f_1$ is the focal length of said first lens group.

22. A zoom lens system comprising, in order from an object side:

a first lens group having a positive refracting power;

a second lens group having a negative refracting power;

a third lens group having a positive refracting power; and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, said second lens group including at least one positive lens, and either one of said third and fourth lens groups including at least one negative lens, said zoom lens system characterized by satisfying the following conditions (1), (2), (3), and (4-2):

$$-2.5 < z_3/z_2 < -0.45 \text{ where } z_2 > 0 \text{ and } z_3 < 0 \quad (1)$$

$$0.05 < f_4/f_1 < 0.41 \quad (2)$$

$$0.9 < (\beta_{34T}/\beta_{34W})/(\beta_{2T}/\beta_{2W}) < 4 \quad (3)$$

$$0 < f_W/f_1 < 0.13, \quad (4\text{-}2)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end, where $f_W$ is the focal length of the overall zoom lens system at the wide-angle end.

23. A zoom lens system comprising, in order from an object side:

a first lens group having a positive refracting power;

a second lens group having a negative refracting power;

a third lens group having a positive refracting power;

a stop fixedly located between said second and third lens groups; and a fourth lens group having a positive refracting power, said second lens group moving toward an image side thereof while said third and fourth lens groups move constantly toward said object side for zooming from a wide-angle end thereof to a telephoto end thereof, and said first lens group consisting only of a positive single lens, said zoom lens system characterized by satisfying the following conditions (1), (2), (3), and (4-2):

$$-2.5 < z_3/z_2 < -0.45 \text{ where } z_2 > 0 \text{ and } z_3 < 0 \quad (1)$$

$$0.05 < f_4/f_1 < 0.41 \quad (2)$$

$$0.9 < (\beta_{34T}/\beta_{34W})(\beta_{2T}/\beta_{2W}) < 4 \quad (3)$$

$$0 < f_W/f_1 < 0.13, \quad (4\text{-}2)$$

where $z_i$ for i=2 or 3 is an amount of movement of an i-th lens group from the wide-angle to telephoto end with the proviso that a plus sign means movement of said lens group from the object side to an image side thereof, fi for i=1 or 4 is a focal length of said i-th lens group, $\beta_{2W}$ is a magnification of said second lens group at the wide-angle end, $\beta_{2T}$ is a magnification of said second lens group at the telephoto end, $\beta_{34W}$ is a composite magnification of said third and fourth lens groups at the wide-angle end, and $\beta_{34T}$ is a composite magnification of said third and fourth lens groups at the telephoto end, where $f_W$ is the focal length of the overall zoom lens system at the wide-angle end.

24. A zoom lens system comprising, in order from an object side;

a first lens group having a positive refracting power;

a second lens group having a negative refracting power;

a third lens group having a positive refracting power; and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, said second lens group including at least one positive lens, and either one of said third and fourth lens groups including at least one negative lens, said zoom lens system characterized by satisfying the following condition (4-2):

$$0 < f_W/f_1 < 0.13 \quad (4\text{-}2)$$

where $f_W$ is the focal length of the overall zoom lens system at the wide-angle end, and $f_1$ is the focal length of said first lens group.

25. A zoom lens system comprising, in order from an object side:

a first lens group having a positive refracting power;

a second lens group having a negative refracting power;

a third lens group having a positive refracting power;

a stop fixedly located between said second and third lens groups; and a fourth lens group having a positive refracting power, said second lens group moving toward an image side thereof while said third and fourth lens groups move constantly toward said object side for zooming from a wide-angle end thereof to a telephoto end thereof, and said first lens group consisting only of a positive single lens, said zoom lens system characterized by satisfying the following condition (4-2):

$$0 < f_w/f_1 < 0.13, \quad (4\text{-}2)$$

where $f_W$ is the focal length of the overall zoom lens system at the wide-angle end, and $f_1$ is the focal length of said first lens group.

26. A zoom lens system comprising, in order from an object side;

a first lens group having a positive refracting power;

a second lens group having a negative refracting power;

a third lens group having a positive refracting power; and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, said second lens group including at least one positive lens, and either one of said third and fourth lens groups including at least one negative lens, said zoom lens system characterized in that only said second lens group is moved for focusing, which movement is towards the object side.

27. A zoom lens system comprising, in order from an object side:

a first lens group having a positive refracting power;

a second lens group having a negative refracting power;

a third lens group having a positive refracting power;

a stop fixedly located between said second and third lens groups; and a fourth lens group having a positive refracting power, said second lens group moving toward an image side thereof while said third and fourth lens groups move constantly toward said object side for zooming from a wide-angle end thereof to a telephoto end thereof, said first lens group consisting only of a positive single lens, wherein only said second lens group is moved for focusing, which movement is towards the object side.

* * * * *